(12) United States Patent
Shibata et al.

(10) Patent No.: US 11,302,974 B2
(45) Date of Patent: Apr. 12, 2022

(54) ELECTRODE STRUCTURE, AIR CELL, AND AIR CELL STACK

(71) Applicant: NISSAN MOTOR CO., LTD., Yokohama (JP)

(72) Inventors: Itaru Shibata, Kanagawa (JP); Noriko Uchiyama, Kanagawa (JP); Hirokazu Komatsu, Kanagawa (JP); Yoshiko Tsukada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 307 days.

(21) Appl. No.: 16/534,669

(22) Filed: Aug. 7, 2019

(65) Prior Publication Data
US 2019/0363414 A1    Nov. 28, 2019

Related U.S. Application Data

(62) Division of application No. 15/104,057, filed as application No. PCT/JP2014/082619 on Dec. 10, 2014, now Pat. No. 10,418,676.

(30) Foreign Application Priority Data

Dec. 19, 2013 (JP) .............................. JP2013-262344
Dec. 2, 2014 (JP) .............................. JP2014-244353

(51) Int. Cl.
*H01M 12/06* (2006.01)
*H01M 6/32* (2006.01)
(Continued)

(52) U.S. Cl.
CPC ........... *H01M 12/065* (2013.01); *H01M 4/06* (2013.01); *H01M 6/32* (2013.01); *H01M 6/5038* (2013.01)

(58) Field of Classification Search
CPC ...... H01M 12/06; H01M 12/065; H01M 4/06; H01M 6/32; H01M 6/5038
See application file for complete search history.

(56) References Cited

U.S. PATENT DOCUMENTS 3,746,580 A    7/1973  Aker et al.
5,376,471 A   12/1994  Hunter et al.
(Continued)

FOREIGN PATENT DOCUMENTS

CN    202352744 U    7/2012
JP    2005-527069 A  9/2005
(Continued)

*Primary Examiner* — Karie O'Neill Apicella
(74) *Attorney, Agent, or Firm* — Foley & Lardner LLP

(57) ABSTRACT

An electrode structure includes a first electrode unit, a second electrode unit and a first insulating frame, in which the electrode units are adjacent to each other. The first insulating unit has an airflow space therein and includes an electrically conducive base with an airflow plane and an air cell cathode disposed on an outer surface of the airflow plane. The second insulating unit includes an electrically conductive base and an air cell anode disposed on an outer surface of the electrically conductive base. The first insulating frame spaces and joins the adjacent electrode units to each other such that the air cell cathode and the air cell anode of the adjacent electrode units are opposed to each other. The first insulating frame together with the adjacent electrode units forms an electrolytic solution container.

8 Claims, 25 Drawing Sheets

(51) Int. Cl.
   *H01M 6/50*      (2006.01)
   *H01M 4/06*      (2006.01)

(56) References Cited

U.S. PATENT DOCUMENTS

| | | | |
|---|---|---|---|
| 7,855,015 B1 | 12/2010 | Benson et al. | |
| 2005/0238949 A1 | 10/2005 | Morris et al. | |
| 2012/0021303 A1* | 1/2012 | Amendola ............ | H01M 12/08 |
| | | | 429/406 |
| 2012/0115068 A1 | 5/2012 | Nakanishi | |
| 2013/0209899 A1 | 8/2013 | Suzuki | |
| 2014/0315106 A1 | 10/2014 | Miyazawa et al. | |
| 2014/0370400 A1 | 12/2014 | Miyazawa et al. | |
| 2015/0086882 A1 | 3/2015 | Tsukada et al. | |
| 2015/0099198 A1 | 4/2015 | Tsukada et al. | |
| 2016/0013528 A1 | 1/2016 | Miyazawa et al. | |

FOREIGN PATENT DOCUMENTS

| | | |
|---|---|---|
| WO | WO-2010/128552 A1 | 11/2010 |
| WO | WO-2013/018769 A1 | 2/2013 |
| WO | WO-2013/084625 A1 | 6/2013 |
| WO | WO-2013/111703 A1 | 8/2013 |
| WO | WO-2013/118771 A1 | 8/2013 |
| WO | WO-2013/125444 A1 | 8/2013 |
| WO | WO-2013/133029 A1 | 9/2013 |

* cited by examiner

ELECTRODE STRUCTURE, AIR CELL, AND AIR CELL STACK

CROSS-REFERENCE TO RELATED APPLICATIONS

The present application is a Divisional of U.S. application Ser. No. 15/104,057, filed Jun. 13, 2016, which is the U.S. National Stage of International Application PCT/JP2014/082619, filed Dec. 10, 2014, and claims priority to Japanese Patent Application Nos. 2013-262344, filed Dec. 19, 2013, and 2014-244353, filed Dec. 2, 2014, the entire contents of all of which are incorporated herein by reference.

TECHNICAL FIELD

The present invention relates to an electrode structure, an air cell (air battery) and an air cell stack (air battery stack). In more detail, the present invention relates to an electrode structure for an air cell that can increase the power output by reducing the current collecting resistance, and to an air cell and an air cell stack that include the electrode structure.

BACKGROUND ART

In air cells, oxygen in the air is used as the cathode active material, and a metal such as aluminum (Al), iron (Fe) or zinc (Zn) is used as the anode active material. Since air cells do not require the cathode active material to be stored in a cell container, they have high energy density and can be reduced in size and weight. Therefore, air cells are expected to be used as a power supply for portable devices and also as a drive power supply for electric vehicles and the like. Further, by storing the electrolytic solution separately from the cell body, air cells do not cause the cell reaction during storage. Since the active materials and electrolytic solution are consumed or degraded little, it is possible to store air cells almost permanently. Therefore, air cells have been drawing attention for use as a reserve power supply for emergency or urgent use.

Regarding the structure of such air cells, a cell (reserve cell) has been proposed which includes a cathode disposed on one side of a member with an approximately frame shape and an anode disposed on the other side thereof opposite to the cathode, and which generates electric power when electrolytic solution is injected into the room defined by the cathode, the anode and the frame member (see Patent Document 1).

CITATION LIST

Patent Literature

Patent Document 1: JP 2005-527069A

SUMMARY OF INVENTION

Technical Problem

To put such air cells into practical use, it is required to stack many single cells in series to form a stack so as to obtain a desired output voltage for an intended use. However, in the air cell described in Patent Document 1, since electrode terminals are pressed against each other to make a contact with each other in order to establish electrical conduction between cells, the contact resistance is high, and the generated current flows through the small electrode terminals. Therefore, the air cell has a problem of large ohmic loss.

The present invention was made in view of the above-described problem with the prior art. Therefore, it is an object of the present invention to provide an electrode structure that reduces the current collecting resistance and thereby improve the output power and to provide an air cell and an air cell stack that include the electrode structure.

Solution to Problem

The present inventors conducted a keen study for achieving the above-described object. As a result, they found that the object can be achieved by employing any one of the following configurations (1) to (4). The present invention was thus completed.

(1) An electrode structure includes a predetermined first electrode unit, a predetermined second electrode unit and a first insulating frame, wherein the electrode units are adjacent to each other, the first insulating frame spaces and joins the adjacent electrode units to each other such that an air cell cathode and an air cell anode of the adjacent electrode units are opposed to each other, and the first insulating frame together with the adjacent electrode units forms an electrolytic solution container.

(2) An electrode structure includes a predetermined first electrode unit, a predetermined second electrode unit, a predetermined third electrode unit and a first insulating frame, wherein the electrode units are adjacent to each other, the first insulating frame spaces and joins adjacent electrode units such that an air cell cathode and an air cell anode of the adjacent electrode units are opposed to each other, and the first insulating frame together with the adjacent electrode units forms an electrolytic solution container.

(3) An electrode structure includes two predetermined first electrode units and a second insulating frame with an air cell anode, wherein the air cell anode is disposed between the two first electrode units, and wherein the second insulating frame includes the air cell anode in the frame and spaces and joins air cell cathodes of the adjacent two first electrode units to the air cell anode such that the air cell cathodes of the adjacent two first electrode units are opposed to the air cell anode, and the second insulating frame together with the adjacent two first electrode units forms an electrolytic solution container.

(4) An electrode structure includes two predetermined first electrode units, a predetermined fourth electrode unit and a second insulating frame with an air cell anode, wherein the air cell anode is disposed between the electrode units, and wherein the second insulating frame includes the air cell anode in the frame and spaces and joins air cell cathodes of adjacent electrode units to the air cell anode such that the air cell cathodes of the adjacent electrode units are opposed to the air cell anode, and the second insulating frame together with the adjacent electrode units forms an electrolytic solution container.

That is, the first electrode structure of the present invention includes the first electrode unit, the second electrode unit and the first insulating frame, wherein the electrode units are adjacent to each other. The first electrode unit has an airflow space therein and includes an electrically conductive base with an airflow plane and the air cell cathode disposed on the outer surface of the airflow plane. The second electrode unit includes an electrically conductive base and the air cell anode disposed on the outer surface thereof. The first insulating frame spaces and joins the adjacent electrode units to each other such that the air cell cathode and the air cell anode of the adjacent electrode units are opposed to each other, and the first insulating frame together with the adjacent electrode units forms the electrolytic solution container.

The second electrode structure of the present invention includes the first electrode unit, the second electrode unit, at least one third electrode unit disposed between the first electrode unit and the second electrode unit and a first insulating frame, wherein the number of the first insulating frame is larger than the number of the third electrode unit by one, and the electrode units are adjacent to each other. The first electrode unit has an airflow space therein and includes an electrically conductive base with an airflow plane and the air cell cathode disposed on the outer surface of the airflow plane. The second electrode unit includes an electrically conductive base and the air cell anode disposed on the outer surface thereof. The third electrode unit has an airflow space therein and includes an electrically conductive base with an airflow plane, the air cell cathode disposed on the outer surface of the airflow plane and the air cell anode disposed on the outer surface of a plane opposite the airflow plane. The first insulating frame spaces and joins adjacent electrode units to each other such that the air cell cathode and the air cell anode of the adjacent electrode units are opposed to each other. The first insulating frame together with the adjacent electrode units forms the electrolytic solution container.

The third electrode structure of the present invention includes the two first electrode units and the second insulating frame with the air cell anode, wherein the air cell anode is disposed between the two first electrode units. The first electrode units each have an airflow space therein and include an electrically conductive base with an airflow plane and the air cell cathode disposed on the outer surface of the airflow plane. The second insulating frame, which includes the air cell anode in the frame, spaces and joins the air cell cathodes of the adjacent two first electrode units to the air cell anode such that the air cell cathodes of the adjacent two first electrode units are opposed to the air cell anode. The second insulating frame together with the adjacent two first electrode units forms the electrolytic solution container.

The fourth electrode structure of the present invention includes two first electrode units, at least one fourth electrode unit disposed between the two first electrode units and the second insulating frame with the air cell anode, wherein the number of the second insulating frame is larger than the number of the fourth electrode unit by one, and the air cell anode is disposed between the electrode units. The first electrode units each have an airflow space therein and include an electrically conductive base with an airflow plane and the air cell cathode on the outer surface of the airflow plane. The fourth electrode unit has an airflow space therein and includes a base with mutually opposed airflow planes and the air cell cathodes disposed on the outer surfaces of the respective airflow planes, in which the air cell cathodes disposed on the outer surfaces of the respective airflow planes are electrically insulated from each other. The second insulating frame, which includes the air cell anode in the frame, spaces and joins the air cell cathodes of adjacent electrode units to the air cell anode such that the air cell cathodes of the adjacent electrode units are opposed to the air cell anode. The second insulating frame together with the adjacent electrode units forms the electrolytic solution container.

An air cell stack of the present invention includes any one of the first to fourth electrode structures of the present invention.

An air cell of the present invention includes the first or third electrode structure of the present invention.

Advantageous Effects of Invention

In the present invention, any one of the following configurations (1) to (4) is employed. Therefore, it is possible to provide electrode structures that can improve the power output by reducing the current collecting resistance and air cells and air cell stacks that include the electrode structure.

(1) A predetermined first electrode unit, a predetermined second electrode unit and a first insulating frame are included, wherein the electrode units are adjacent to each other, the first insulating frame spaces and joins the adjacent electrode units to each other such that an air cell cathode and an air cell anode of the adjacent electrode units are opposed to each other, and the first insulating frame together with the adjacent electrode units forms an electrolytic solution container.

(2) A predetermined first electrode unit, a predetermined second electrode unit, a predetermined third electrode unit and a first insulating frame are included, wherein the electrode units are adjacent to each other, the first insulating frame spaces and joins adjacent electrode units such that an air cell cathode and an air cell anode of the adjacent electrode units are opposed to each other, and the first insulating frame together with the adjacent electrode units forms an electrolytic solution container.

(3) Two predetermined first electrode units and a second insulating frame with an air cell anode are included, wherein the air cell anode is disposed between the two first electrode units, and wherein the second insulating frame includes the air cell anode in the frame and spaces and joins air cell cathodes of the adjacent two first electrode units to the air cell anode such that the air cell cathodes of the adjacent two first electrode units are opposed to the air cell anode, and the second insulating frame together with the adjacent two first electrode units forms an electrolytic solution container.

(4) Two predetermined first electrode units, a predetermined fourth electrode unit and a second insulating frame with an air cell anode are included, wherein the air cell anode is disposed between the electrode units, and wherein the second insulating frame includes the air cell anode in the frame and spaces and joins air cell cathodes of adjacent electrode units to the air cell anode such that the air cell cathodes of the adjacent electrode units are opposed to the air cell anode, and the second insulating frame together with the adjacent electrode units forms an electrolytic solution container.

DESCRIPTION OF EMBODIMENTS

Figure 1A:
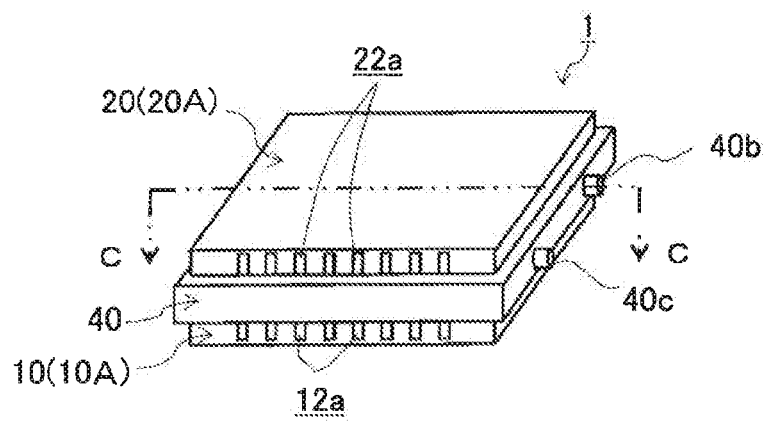
FIG. 1A is a perspective view of an example of an electrode structure according to a first embodiment.

Hereinafter, an electrode structure, an air cell and an air cell stack according to an embodiment of the present invention will be described in detail referring to the drawings. The dimension of the drawings referred to in the following embodiment may be exaggerated for descriptive reasons and may thus be different from the actual dimension. As used herein, an outer surface, when used simply as in "the outer surface of an electrically conductive base", "the outer surface on one side of an electrically conductive base" and "the outer surface on the other side of an electrically conducive base", does not mean the outer surface of an electrically conductive base that is parallel to the unit stacking direction but means the outer surface of an electrically conductive base that is perpendicular to the unit stacking direction. Further, the outer surface of an electrically conductive base that is perpendicular to the unit stacking direction encompasses not only the outer surface of the electrically conductive base that is perpendicular to the unit stacking direction but also the outer surface of the electrically conductive base that is approximately perpendicular to the unit stacking direction.

First Embodiment

First, a few examples of an electrode structure and an air cell according to a first embodiment will be described in detail referring to the drawings.

Figure 1B:
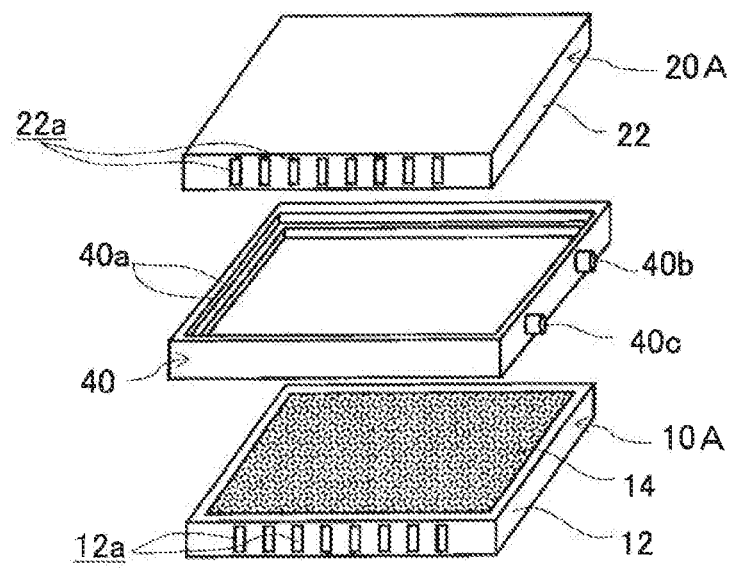
FIG. 1B is an exploded perspective view of the electrode structure of FIG. 1A.
Figure 1C:
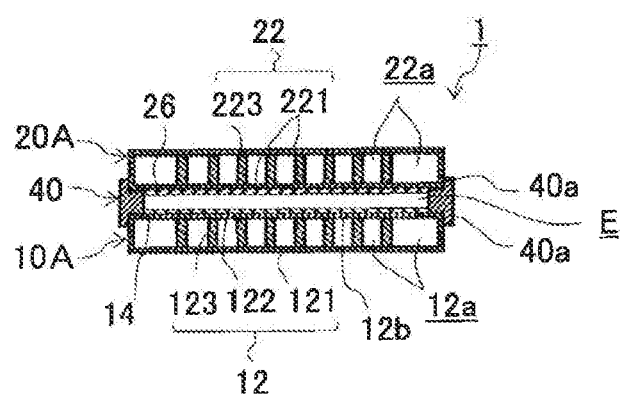
FIG. 1C is a schematic cross sectional view of the electrode structure of FIG. 1A taken along the line C-C.

FIG. 1A is a perspective view of an example of the electrode structure according to the first embodiment. FIG. 1B is an exploded perspective view of the electrode structure of FIG. 1A. FIG. 1C is a schematic cross sectional view of the electrode structure of FIG. 1A taken along the line C-C.

As illustrated in FIGS. 1A, 1B and 1C, the electrode structure 1 of this example includes a first electrode unit 10, a second electrode unit 20 and a first insulating frame 40, in which the electrode units (10, 20) are adjacent to each other. The first electrode unit 10 (hereinafter also referred to as the "first-A electrode unit 10A") has an airflow space 12a therein and includes a box electrically conductive base 12 having an airflow plane 12b with an airflow portion on one side thereof and an air cell cathode layer 14 disposed on a part of the outer surface of the airflow plane 12b. The second electrode unit 20 (hereinafter also referred to as the "second-A electrode unit 20A") includes a box electrically conductive base 22 having an airflow space 22a therein and an air cell anode layer 26 disposed on a part of the outer surface of the electrically conductive base 22. The first insulating frame 40 spaces and joins the adjacent electrode units (10, 20) to each other such that the air cell cathode layer 14 and the air cell anode layer 26 of the adjacent electrode units (10, 20) are opposed to each other across the entire area of an electrolytic solution container E. The first insulating frame 40 together with the adjacent electrode units (10, 20) forms the electrolytic solution container E. In this example, the first insulating frame 40 includes steps (40a, 40a) in which the first-A electrode unit 10A and the second-A electrode unit 20A fit. Further, in this example, the first insulating frame 40 has a supply opening 40b for supplying electrolytic solution (not shown) to the electrolytic solution container E and a discharge opening 40c for discharging gas such as air in the electrolytic solution container E while the electrolytic solution (not shown) is supplied. When the electrolytic solution container E is filled with the electrolytic solution (not shown), the electrode structure 1 of this example operates as an air cell capable of generating electric power.

With this configuration, the current collecting resistance can be reduced, and the power output can thereby be improved. Also in the air cell with the electrode structure, the current collecting resistance can be reduced, and the power output can thereby be improved.

By supplying air to the airflow space at the air cell anode, an increase of the electrolytic solution temperature due to discharge can be moderated. In other words, the heat dissipation performance of the air cell can be improved. As a result, evaporation of water from the electrolytic solution can be reduced, and accumulation of a corrosion product between the air cell anode and cathode can thereby be prevented, which is produced in a large amount due to elution of an air cell anode metal material into the electrolytic solution during discharge.

Further, an increase of the corrosion product concentration in the electrolytic solution can be moderated, and the discharge time of the air cell can thereby be extended.

Next, each of the components will be described in detail.

The electrically conductive base 12 may be any base that has a function of supporting an air cell cathode layer and a function as an air channel that is formed by the airflow space 12a and the airflow plane 12b and enables supplying an oxygen containing gas such as air to the air cell cathode layer 14. For example, the outer shape of the electrically conductive base 12 is not limited to a rectangular plate shape and may be a disk shape or even a non-plate shape instead. The airflow space 12a may be provided, for example, by joining a metal non-gas permeable plate 121 and a gas-permeable plate 122 to each other by metal ribs 123 so as to form a box electrically conductive base. Further, the airflow plane 12b is provided preferably by using as the metal gas-permeable plate 122 a foam metal plate, an etched metal plate, a punched metal plate or the like having a plurality of micro pores as the airflow portion.

The air cell cathode layer 14 may be made of a material that uses oxygen as a cathode active material and contains, for example, a redox catalyst for oxygen and an electrically conductive support supporting a required catalyst that is added as needed. Although not shown in the figures, the air cell cathode layer includes a liquid-tight gas-permeable layer that is disposed on the side facing the airflow space in order to reduce or prevent a leakage of the electrolytic solution loaded in the electrolytic solution container. In this example, the air cell cathode layer is disposed on the outer surface of the airflow plane via the liquid-tight gas-permeable layer (not shown) such as an electrically conductive water repellent layer. The electrically conductive water repellent layer, which is impermeable to the electrolytic solution (e.g. impermeable to water) but permeable to oxygen, reduces or prevents a leakage of the electrolytic solution to the outside while allowing oxygen supply to the air cell cathode layer. For example, a preferred electrically conductive water repellent layer is composed of a water repellent porous resin such as a polyolefin resin (e.g. polypropylene or polyethylene) or a fluorinated resin (e.g. polytetrafluoroethylene) and an electrically conductive material such as graphite.

The catalyst can be selected from, for example, metal oxides such as manganese dioxide and tricobalt tetroxide, metals such as platinum (Pt), ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), Gallium (Ga) and aluminum (Al), alloys and oxides of such metals, and the like.

The shape and size of the catalyst are not particularly limited and may be the same as those of catalysts known in the art. However, it is preferred that the catalyst has a granular shape, and the catalyst particles have an average particle size of preferably from 1 nm to 30 nm. When the average particle size of the catalyst particles are within this range, it is possible to suitably control the balance between the catalyst efficiency, which relates to the active electrode area where the electrochemical reaction proceeds, and ease of supporting the catalyst.

The support functions not only as a support that supports the catalyst but also as an electron conducting path that is involved in electron transfer between the catalyst and the other components. The support may be any support that has a specific surface area sufficient to support the catalyst component in a desired dispersed state and has sufficient electron conductivity. Carbon-based supports are preferred. Specific examples of such supports include carbon particles of carbon black, activated carbon, coke, natural graphite, artificial graphite or the like.

The size of the support is not particularly limited, either. In terms of ease of support, the catalyst efficiency, controlling the thickness of a catalyst layer within a suitable range, the average particle size may be approximately from 5 nm to 200 nm, preferably approximately from 10 nm to 100 nm.

The amount of catalyst supported relative to the support is preferably from 10 to 80 mass %, more preferably from 30 to 70 mass % with respect to the total amount of the catalyst and the support supporting the catalyst. When the amount of catalyst supported is within this range, a good balance is achieved between the dispersion of the catalyst on the support and the catalyst performance.

The above-described catalyst and the support that supports the catalyst is not limited to the above-described type, and it should be understood well that the any material known in the art that is used for air cells may be suitably used.

The electrically conductive base 22 is not particularly limited and may be any base that has a function of supporting the air cell anode. For example, the outer shape of the electrically conductive base 22 is not limited to a rectangular plate shape and may be a disk shape or even a non-plate shape instead. Further, the airflow space 22a can be provided, for example, by joining a metal non-gas permeable plate 221 and a non-gas permeable plate 221 to each other via metal ribs 223 so as to form a box electrically conductive base.

Suitable materials that can be used for the air cell anode layer 26 include pure base metals that have a standard electrode potential less than hydrogen and alloys of such metals. Such pure metals include, for example, zinc (Zn), iron (Fe), aluminum (Al), magnesium (Mg) and the like. Such alloys include alloys of such a metal element with one or more metal or non-metal elements. However, the material is not limited thereto, and any material known in the art that is used for air cells can be used.

The first insulating frame 40 is made of, for example, an electrically insulating material such as resin. The first insulating frame 40 spaces and joins the first-A electrode unit 10A and the second-A electrode unit 20A to each other such that the air cell cathode layer 14 of the first-A electrode unit 10A and the air cell anode layer 26 of the second-A electrode unit 20A are opposed to each other. The first insulating frame 40 forms the electrolytic solution container E between the air cell cathode layer 14 and the air cell anode layer 26. Further, in the outer side surface, the first insulating frame 40 has the supply opening 40b for supplying the electrolytic solution (not shown) to the electrolytic solution container E and the discharge opening 40c for discharging gas such as air in the electrolytic solution container E while the electrolytic solution (not shown) is supplied. Further, in the inner side surface, the first insulating frame 40 includes the step 40a in which the first-A electrode unit 10A fits and the step 40a in which the second-A electrode unit 20A fits. These steps (40a, 40a) may be provided by forming a ridge on the inner side surface of the first insulating frame. Further, by fitting the first-A electrode unit 10A and the second-A electrode unit 20A in the steps (40a, 40a), they can be joined more firmly compared to a frame without any step.

Electrolytic solutions that can be used include, for example, aqueous solutions of potassium chloride (KCl), sodium chloride (NaCl), potassium hydroxide (KOH), sodium hydroxide (NaOH) and the like. However, the electrolytic solution is not limited to thereto, and any electrolytic solution known in the art that is used for air cells can be used.

When the electrolytic solution container E is filled with the electrolytic solution, the electrode structure 1 of this example operates as an air cell capable of generating electric power.

Figure 2A:
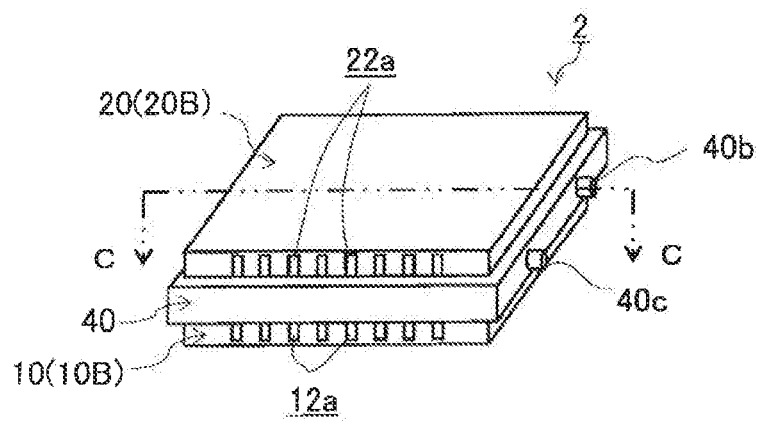
FIG. 2A is a perspective view of another example of the electrode structure according to the first embodiment.
Figure 2B:
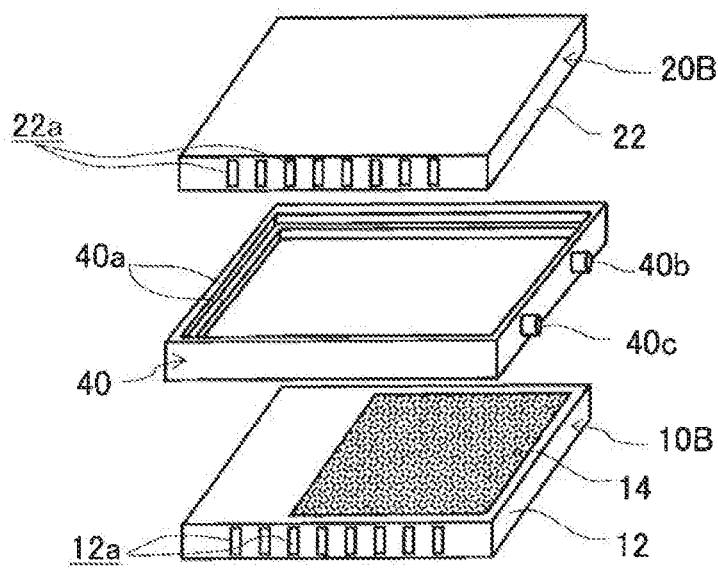
FIG. 2B is an exploded perspective view of the electrode structure of FIG. 2A.
Figure 2C:
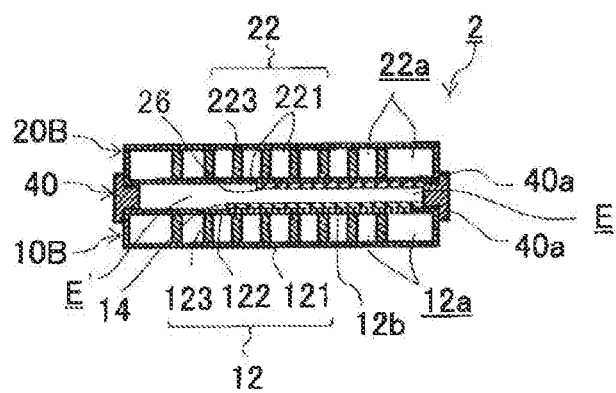
FIG. 2C is a schematic cross sectional view of the electrode structure of FIG. 2A taken along the line C-C.

FIG. 2A is a perspective view of another example of the electrode structure according to the first embodiment. FIG. 2B is an exploded perspective view of the electrode structure of FIG. 2A. FIG. 2C is a schematic cross sectional view of the electrode structure of FIG. 2A taken along the line C-C. The same reference signs are denoted to the same components as those of the previously-described example, and the description thereof is omitted.

As illustrated in FIGS. 2A, 2B and 2C, the electrode structure 2 of this example includes a first electrode unit 10, a second electrode unit 20 and a first insulating frame 40, in which the electrode units (10, 20) are adjacent to each other. The first electrode unit 10 (hereinafter also referred to as the "first-B electrode unit 10B") has an airflow space 12a therein and includes a box electrically conductive base 12 having an airflow plane 12b with an airflow portion on one side thereof and an air cell cathode layer 14 disposed on a part of the outer surface of the airflow plane 12b. The second electrode unit 20 (hereinafter also referred to as the "second-B electrode unit 20B") includes a box electrically conductive base 22 having an airflow space 22a therein and an air cell anode layer 26 disposed on a part of the outer surface of the electrically conductive base 22. The first insulating frame 40 spaces and joins the adjacent electrode units (10, 20) to each other such that the air cell cathode layer 14 and the air cell anode layer 26 of the adjacent electrode units (10, 20) are opposed to each other across a part of an electrolytic solution container E. The first insulating frame 40 together with the adjacent electrode units (10, 20) forms the electrolytic solution container E. In the figures, the part of the electrolytic solution container E that is not sandwiched between the air cell cathode layer 14 and the air cell anode layer 26 is denoted as E.' Also in this example, the first insulating frame 40 includes steps (40a, 40a) in which the first-B electrode unit 10B and the second-B electrode unit 20B fit. Further, also in this example, the first insulating frame 40 has a supply opening 40b for supplying the electrolytic solution (not shown) to the electrolytic solution container E and a discharge opening 40c for discharging gas such as air in the electrolytic solution container E while the electrolytic solution is supplied. When the electrolytic solution container E is filled with the electrolytic solution (not shown), the electrode structure 2 of this example operates as an air cell capable of generating electric power.

With this configuration, the current collecting resistance can be reduced, and the power output can thereby be improved. Also in the air cell with the electrode structure, the current collecting resistance can be reduced, and the power output can thereby be improved.

Since the air cell cathode layer and air cell anode layer are opposed to each other across a part of the electrolytic solution container so that the electrolytic solution container has a part that is not sandwiched between the air cell cathode layer and the air cell anode layer, it is possible to prevent accumulation of a corrosion product between the air cell anode and cathode, which is produced in a large amount due to elution of an air cell anode metal material into the electrolytic solution during discharge.

Further, since the air cell cathode layer and air cell anode layer are opposed to each other across a part of the electrolytic solution container so that the electrolytic solution container has a part that is not sandwiched between the air cell cathode layer and the air cell anode layer, it is possible to cool the electrolytic solution in this part by supplying air to the airflow space on the air cell cathode side. This can moderate an increase of the electrolytic solution temperature due to discharge. Of course, supplying air to the airflow space on the air cell anode side can also moderate an increase of the electrolytic solution temperature due to discharge. In other words, the heat dissipation performance of the air cell can be improved. As a result, evaporation of water from the electrolytic solution can be reduced, and accumulation of a corrosion product between the air cell anode and cathode can thereby be prevented, which is produced in a large amount due to elution of an air cell anode metal material into the electrolytic solution during discharge.

Further, an increase of the corrosion product concentration in the electrolytic solution can be moderated, and the discharge time of the air cell can thereby be extended.

Figure 3A:
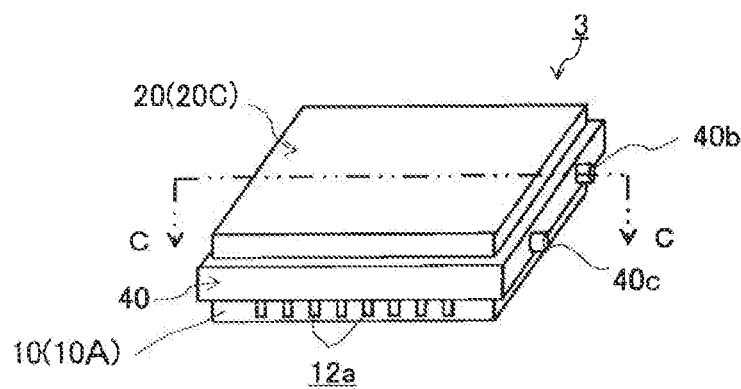
FIG. 3A is a perspective view of yet another example of the electrode structure according to the first embodiment.
Figure 3B:
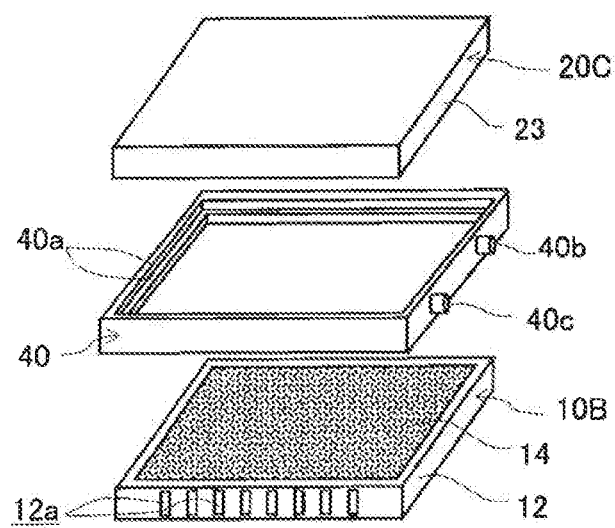
FIG. 3B is an exploded perspective view of the electrode structure of FIG. 3A.
Figure 3C:
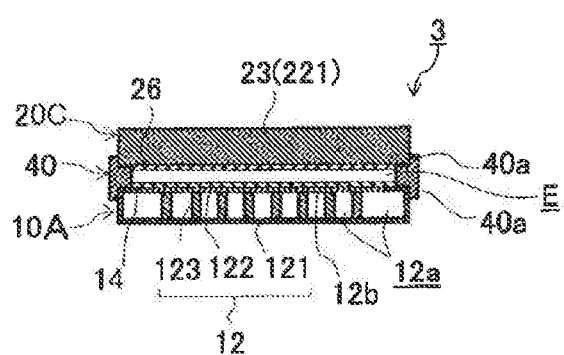
FIG. 3C is a schematic cross sectional view of the electrode structure of FIG. 3A taken along the line C-C.

FIG. 3A is a perspective view of yet another example of the electrode structure according to the first embodiment. FIG. 3B is an exploded perspective view of the electrode structure of FIG. 3A. FIG. 3C is a schematic cross sectional view of the electrode structure of FIG. 3A taken along the line C-C. The same reference signs are denoted to the same components as those of the previously-described examples, and the description thereof is omitted.

As illustrated in FIGS. 3A, 3B and 3C, the electrode structure 3 of this example includes a first electrode unit 10, a second electrode unit 20 and a first insulating frame 40, in which the electrode units (10, 20) are adjacent to each other. The first electrode unit 10 is constituted by a first-A electrode unit 10A. The second electrode unit 20 (hereinafter also referred to as the "second-C electrode unit 20C") includes an electrically conductive base 23 with no airflow space therein and an air cell anode layer 26 on a part of the outer surface of the electrically conductive base 23. The first insulating frame 40 spaces and joins the adjacent electrode units (10, 20) to each other such that an air cell cathode layer 14 and the air cell anode layer 26 of the adjacent electrode units (10, 20) are opposed to each other across the entire area of the electrolytic solution container E. The first insulating frame 40 together with the adjacent electrode units (10, 20) forms an electrolytic solution container E. Also in this example, the first insulating frame 40 includes steps (40a, 40a) in which the first-A electrode unit 10A and the second-C electrode unit 20C fit. Further, the first insulating frame 40 has a supply opening 40b for supplying electrolytic solution (not shown) to the electrolytic solution container E and a discharge opening 40c for discharging gas such as air in the electrolytic solution container E while the electrolytic solution is supplied. When the electrolytic solution container E is filled with the electrolytic solution (not shown), the electrode structure 3 of this example operates as an air cell capable of generating electric power.

Also with this configuration, the current collecting resistance can be reduced, and the power output can thereby be improved. Also in the air cell with the electrode structure, the current collecting resistance can be reduced, and the power output can thereby be improved.

Next, each of the components will be described in detail.

The electrically conductive base 23 is not particularly limited and may be any base that has a function of supporting the air cell anode. For example, the outer shape of the electrically conductive base 23 is not limited to a rectangular plate shape, and may be a disk shape or even a non-plate shape instead. The electrically conductive base 23 may be constituted by, for example, the above-described non-gas permeable metal plate 221 itself.

Although not shown in the figure, in the above-described first embodiment, the air cell cathode layer may be provided over the entire outer surface of the airflow plane of the electrically conductive base of the first electrode unit. Also, the air cell anode layer may be provided over the entire outer surface of the electrically conductive base of the second electrode unit. However, when such electrode units fit in the first insulating frame, it is difficult to utilize the fitted parts in the cell reaction. Further, utilization of the fitted parts in the cell reaction may decrease the joining strength. Therefore, it is preferred that the air cell cathode layer is provided on a part of the outer surface of the airflow plane of electrically conductive base of the first electrode unit. Also, it is preferred that the air cell anode layer is provided on a part of the outer surface of the electrically conductive base of the second electrode unit.

Although not shown in the figure, in the above-described first embodiment, it is not essential that the first insulating frame includes the step for fitting the first electrode unit and the step for fitting the second electrode unit. However, since the fitted electrode units can be joined more firmly, it is preferred to provide the step for fitting the first electrode unit and the step for fitting the second electrode unit. Further, although not shown in the figure, only one of the step for fitting the first electrode unit and the step for fitting the second electrode unit may be provided.

Although not shown in the figure, in the above-described first embodiment, an air cell anode layer may be provided on all or a part of the outer surface of a plane opposite the airflow plane of the electrically conductive base of the first electrode unit. Further, although not shown in the figure, in the above-described first embodiment, the plane opposite the plane with the air cell anode layer is the airflow plane with an airflow portion in the electrically conductive base of the second electrode unit, and an air cell cathode layer may be provided on all or a part of the outer surface of the airflow plane.

Regarding the timing of supplying the electrolytic solution in the above-described first embodiment, the air cell is desirably of a liquid-activated type, in which the air cell is stored with the electrolytic solution container empty until it becomes necessary to activate the cell, and the electrolytic solution is injected just before using the air cell. The liquid-activated air cell can avoid consumption, transformation or deterioration of the electrolytic solution and the active materials during storage. This enables almost permanent storage, and the cell can therefore be effectively used as an emergency reserve power supply. Further, in this case, the electrolytic solution may be stored as its separate solvent and electrolyte. This can ease the constraint on the material of an electrolytic solution tank.

In the above-described first embodiment, it is not essential that the first electrode unit includes the air cell cathode on a part of the outer surface of the airflow plane of the electrically conductive base, the second electrode unit includes the air cell anode on a part of the outer surface of the electrically conductive base, and the first insulating frame has an open area that is larger than the electrode area of non-smaller one between the air cell cathode and the air cell anode. However, when the predetermined first electrode unit and the second electrode unit are joined to each other by the first insulating frame, it is preferred that the first insulating frame has an open area that is larger than the electrode area of non-smaller one between the air cell cathode and the air cell anode. With this configuration, the electrode units can be joined firmly.

In the above-described first embodiment, it is preferred that the electrode area of the air cell cathode is larger than the electrode area of the air cell anode opposed to the electrode cathode. This is because the activity of the reaction is lower in the air cell cathode than in the air cell anode. With this configuration, the difference in reaction activity between the electrodes is less likely to limit the cell performance.

In the present invention, the electrode area of an electrode means the projected area in the thickness direction of the electrode layer, which is the area of a portion exposed to the electrolytic solution container. As is described in detail below, Q value is defined as the ratio of the area of the electrode layers formed in an electrode unit to the area of the interface between an electrolytic solution container defined by the electrode unit and the like and the electrode unit. For example, a higher Q value means that the amount of electrolytic solution relative to the electrodes is smaller. Further, for example, when electrode layers are formed on a half of the interface between an electrolytic solution container and an electrode unit, the Q value is 0.5.

Second Embodiment

Next, a few examples of an electrode structure and an air cell stack according to a second embodiment will be described referring to the drawings.

Figure 4:
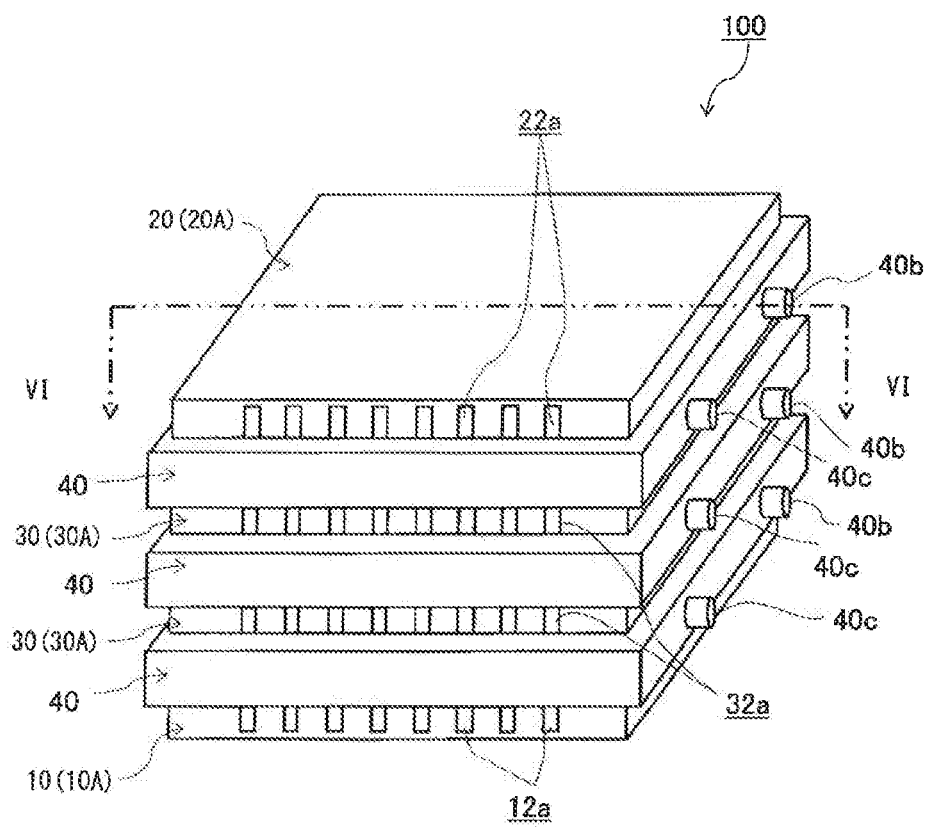
FIG. 4 is a perspective view of an example of an electrode structure according to a second embodiment.
Figure 5:
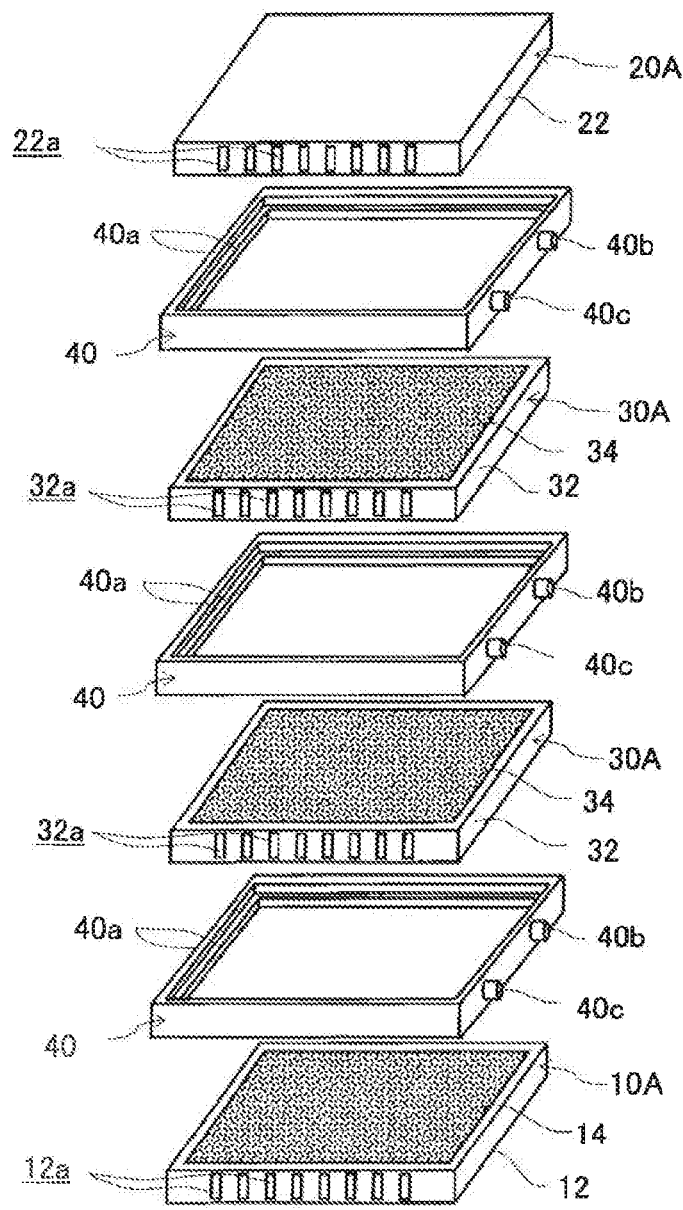
FIG. 5 is an exploded perspective view of the electrode structure of FIG. 4.
Figure 6:
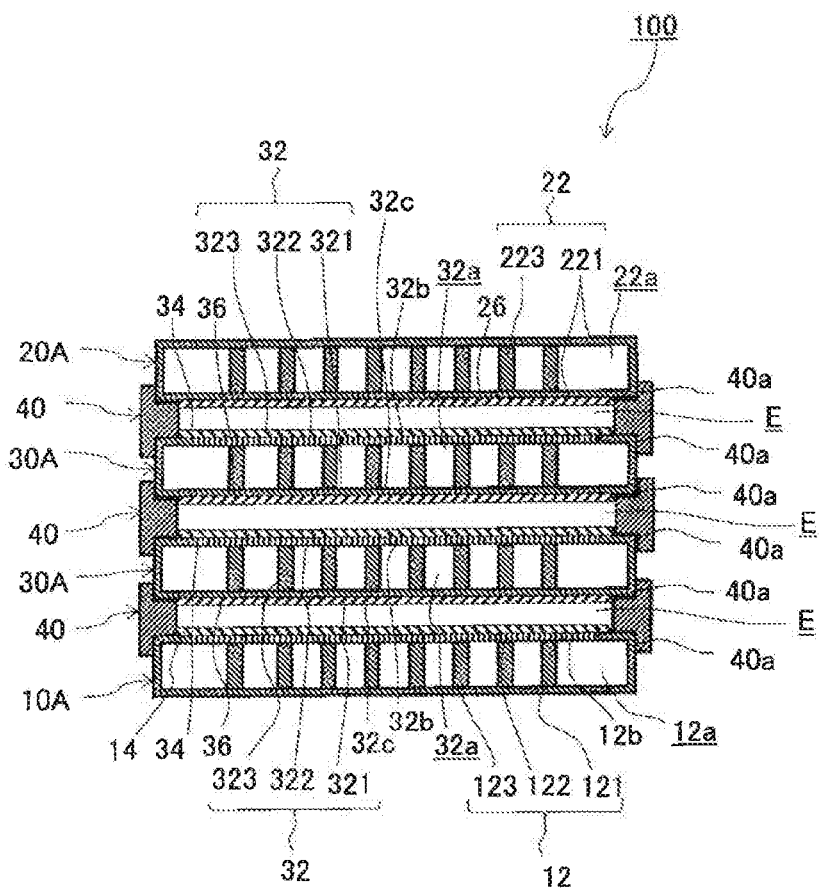
FIG. 6 is a schematic cross sectional view of the electrode structure of FIG. 4 taken along the line VI-VI.

FIG. 4 is a perspective view of an example of an electrode structure according to the second embodiment. FIG. 5 is an exploded perspective view of the electrode structure of FIG. 4. FIG. 6 is a schematic cross sectional view of the electrode structure of FIG. 4 taken along the line VI-VI. The same reference signs are denoted to the same components as those of the previously-described embodiment, and the description thereof is omitted.

As illustrated in FIG. 4 to FIG. 6, the electrode structure 100 of this example includes a first electrode unit 10, a second electrode unit 20, two third electrode units 30 disposed between the first electrode unit 10 and the second electrode unit 20 and three first insulating frames 40, in which the electrode units (10, 20, 30) are adjacent to each other. The first electrode unit 10 is constituted by a first-A electrode unit 10A. The second electrode unit 20 is constituted by a second-A electrode unit 20A. Each of the third electrode units 30 (hereinafter also referred to as the "third-A electrode units 30A") has an airflow space 32a therein and includes a box electrically conductive base 32 having an airflow plane 32b with an airflow portion on one side thereof, an air cell cathode layer 34 on a part of the outer surface of the airflow plane 32b and an air cell anode layer 36 on a part of the outer surface of a plane 32c opposite the airflow plane 32b. The first insulating frames 40 space and join adjacent electrode units (10, 20, 30) to each other such that pairs of the air cell cathode layer 14 and the air cell anode layer 36, the air cell cathode layer 34 and the air cell anode layer 36, and the air cell cathode layer 34 and the air cell anode layer 26 of the adjacent electrode units (10, 20, 30) are respectively opposed to each other across the entire area of electrolytic solution containers E. Further, the first insulating frames 40 together with the adjacent electrode units (10, 20, 30) form the electrolytic solution containers E. Also in this example, the first insulating frames 40 include steps (40a, 40a, 40a) in which the first-A electrode unit 10A, the second-A electrode unit 20A and the third-A electrode units 30A fit. Further, also in this example, the first insulating frames 40 have supply openings 40*b* for supplying electrolytic solution (not shown) to the electrolytic solution containers E and discharge openings 40*c* for discharging gas such as air in the electrolytic solution containers E while the electrolytic solution is supplied. When the electrolytic solution containers E are filled with the electrolytic solution (not shown), the electrode structure 100 of this example operates as an air cell stack capable of generating electric power.

With this configuration, the current collecting resistance can be reduced, and the power output can thereby be improved. Also in the air cell stack with the electrode structure, the current collecting resistance can be reduced, and the power output can thereby be improved.

FIG. 4 to FIG. 6 illustrate an example in which the stack is composed of three cells using four electrode units. However, it should be understood well that a stack composed of more cells can be formed by further disposing another third electrode unit and another first insulating frame between the above-described electrode units. By inserting an additional third electrode unit and an additional first insulating frame, it is possible to adjust the output performance according to an intended use. Further, the usage of the third electrode units can reduce the current collecting loss to a great extent.

When air is supplied to the airflow spaces, it is supplied not only to the air cell cathodes but also to the air cell anodes. This can moderate an increase of the electrolytic solution temperature due to discharge. In other words, the heat dissipation performance of the air cell stack can be improved. As a result, evaporation of water from the electrolytic solution can be reduced, and accumulation of a corrosion product between the air cell anode and cathode can thereby be prevented, which is produced in a large amount due to elution of an air cell anode metal material into the electrolytic solution during discharge.

Further, an increase of the corrosion product concentration in the electrolytic solution can be moderated, and the discharge time of the air cell can thereby be extended.

Next, each of the components will be described in detail.

The electrically conductive bases 32 are not particularly limited and may be any base that has a function of supporting the air cell cathodes and the air cell anodes and a function as an air channel that is formed by the airflow spaces 32*a* and the airflow planes 32*b* and enables supplying an oxygen containing gas such as air to the air cell cathode layers 34. For example, the outer shape of the electrically conductive bases 32 is not limited to a rectangular plate shape and may be a disk shape or even a non-plate shape instead. The airflow spaces 32*a* may be provided, for example, by joining a non-gas permeable metal plate 321 and a gas-permeable metal plate 322 to each other via metal ribs 323 so as to form a box electrically conductive base. The airflow planes 32*b* are provided preferably by using as the metal gas-permeable plate 322 a foam metal plate, an etched metal plate, a punched metal plate or the like that has a plurality of micro pores as the airflow portion.

The air cell cathode layers 34 and the air cell anode layers 36 may have, for example, the same configuration respectively as the air cell layer 14 and the air cell anode layer 26.

Figure 7:
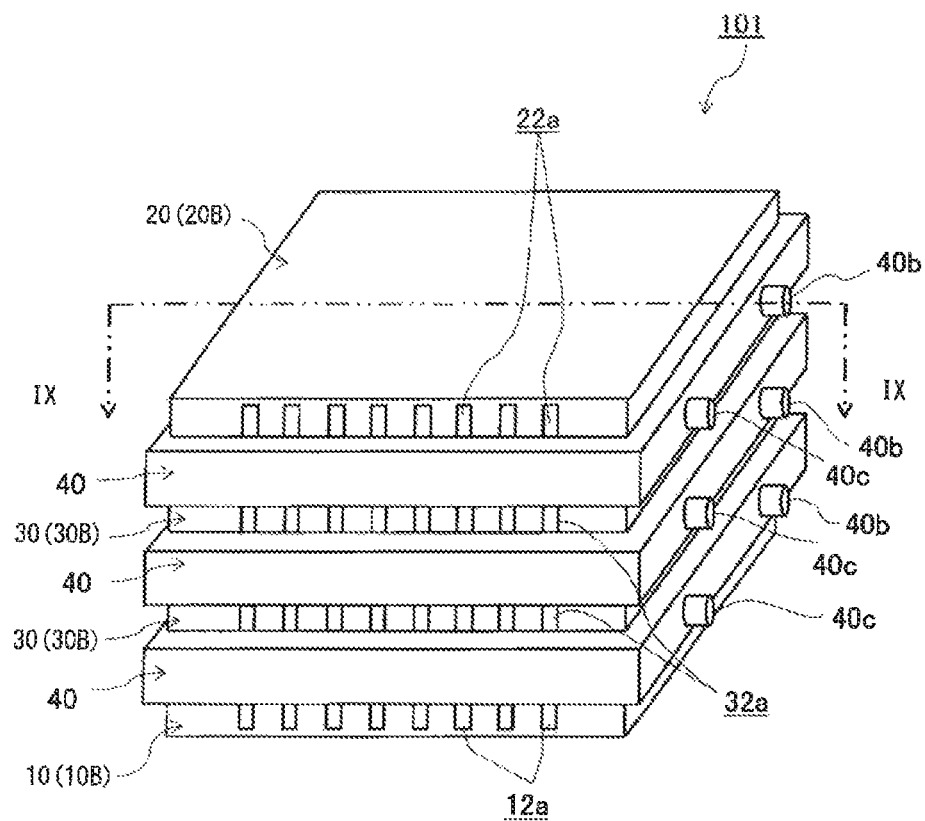
FIG. 7 is a perspective view of another example of the electrode structure according to the second embodiment.
Figure 8:
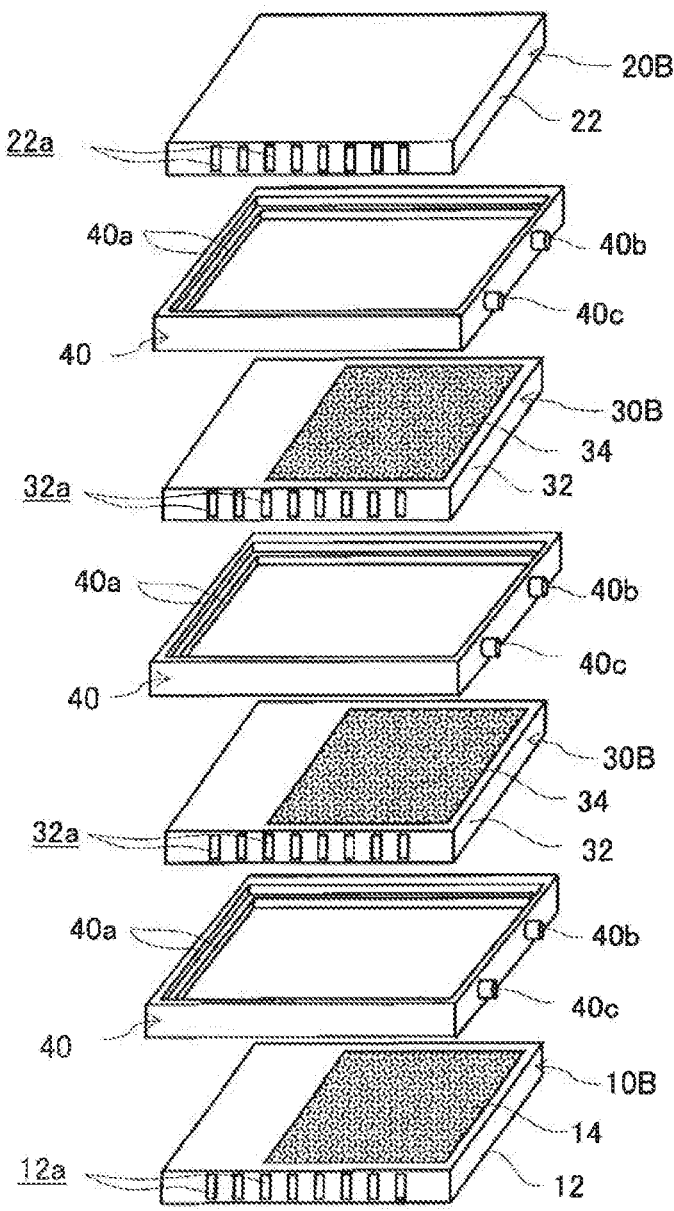
FIG. 8 is an exploded perspective view of the electrode structure of FIG. 7.
Figure 9:
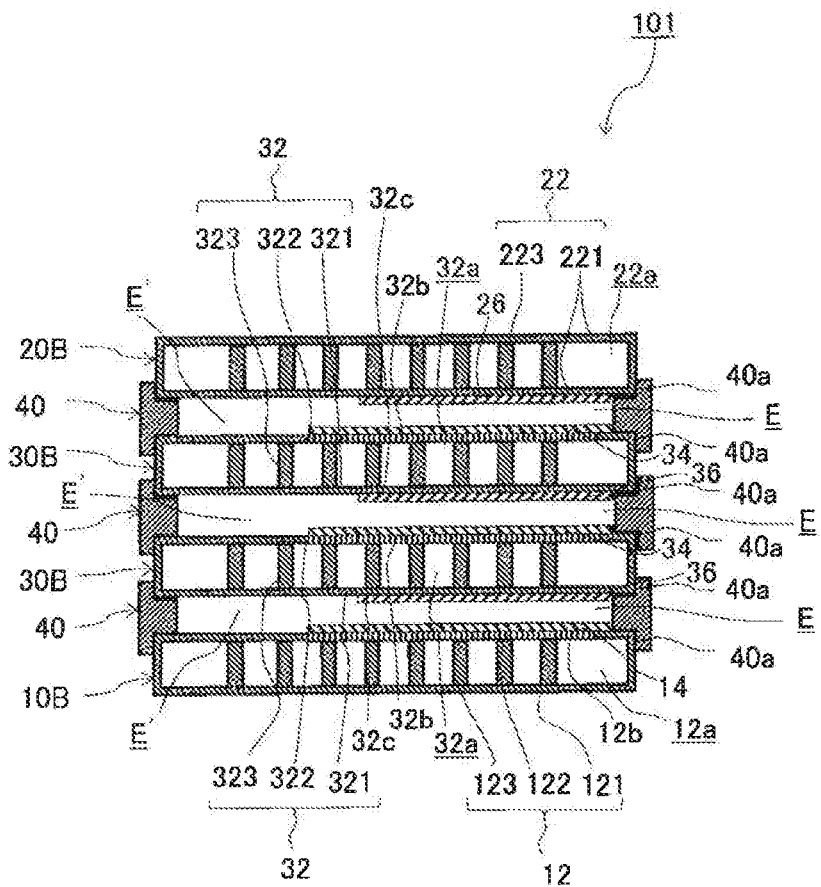
FIG. 9 is a schematic cross sectional view of the electrode structure of FIG. 7 taken along the line IX-IX.

FIG. 7 is a perspective view of another example of the electrode structure according to the second embodiment. FIG. 8 is an exploded perspective view of the electrode structure of FIG. 7. FIG. 9 is a schematic cross sectional view of the electrode structure of FIG. 7 taken along the line IX-IX. The same reference signs are denoted to the same components as those of the above-described embodiment, and the description thereof is omitted.

As illustrated in FIG. 7 to FIG. 9, the electrode structure 101 of this example includes a first electrode unit 10, a second electrode unit 20, two third electrode units 30 disposed between the first electrode unit 10 and the second electrode unit 20 and three first insulating frames 40, in which the electrode units (10, 20, 30) are adjacent to each other. The first electrode unit 10 is constituted by a first-B electrode unit 10B. The second electrode unit 20 is constituted by the second-B electrode unit 20B. Each of the third electrode units 30 (hereinafter also referred to as the "third-B electrode units 30B) has an airflow space 32*a* therein and includes a box electrically conductive base 32 having an airflow plane 32*b* with an airflow portion on one side thereof, an air cell cathode layer 34 on a part of the outer surface of the airflow plane 32*b* and an air cell anode layer 36 on a part of the outer surface of a plane 32*c* opposite the airflow plane 32*b*. Further, the first insulating frames 40 space and join the adjacent electrode units (10, 20, 30) to each other such that pairs of the air cell cathode layer 14 and the air cell anode layer 36, the air cell cathode layer 34 and the air cell anode layer 36, and the air cell cathode layer 34 and the air cell anode layer 26 of the adjacent electrode units (10, 20, 30) are respectively opposed to each other across a part of electrolytic solution containers E. Further, the first insulating frames 40 together with the adjacent electrode units (10, 20, 30) form the electrolytic solution containers E. In the figures, the parts of the electrolytic solution containers E that are not sandwiched between the air cell cathode layers (14, 34) and the air cell anode layers (26, 36) are denoted as E'. Also in this example, the first insulating frames 40 include steps (40*a*, 40*a*, 40*a*) in which the first-B electrode unit 10B, the second-B electrode unit 20B and the third-B electrode units 30B fit. Also in this example, the first insulating frames 40 have supply openings 40*b* for supplying electrolytic solution (not shown) to the electrolytic solution containers E and discharge openings 40*c* for discharging gas such as air in the electrolytic solution containers E while the electrolytic solution is supplied. When the electrolytic solution containers E are filled with the electrolytic solution (not shown), the electrode structure 101 of this example operates as an air cell stack capable of generating electric power.

With this configuration, the current collecting resistance can be reduced, and the power output can thereby be improved. Also in the air cell stack with the electrode structure, the current collecting resistance can be reduced, and the power output can thereby be improved.

FIG. 7 to FIG. 9 illustrate an example in which the stack is composed of three cells using four electrode units. However, it should be understood well that a stack composed of more cells can be formed by disposing another third electrode unit and another first insulating frame between the above-described electrode units. By inserting an additional third electrode unit and an additional first insulating frame, it is possible to adjust the output performance according to an intended use. Further, the usage of the third electrode units can reduce the current collecting loss to a great extent.

When air is supplied to the airflow spaces, it is supplied not only to the air cell cathodes but also to the air cell anodes. This can moderate an increase of the electrolytic solution temperature due to discharge. In other words, the heat dissipation performance of the air cell stack can be improved. As a result, evaporation of water from the electrolytic solution can be reduced, and accumulation of a corrosion product between the air cell anodes and cathodes can thereby be prevented, which is produced in a large amount due to elution of an air cell anode metal material into the electrolytic solution during discharge.

Since the air cell cathode layers and air cell anode layers are opposed to each other across a part of the electrolytic solution containers so that the electrolytic solution containers have parts that are not sandwiched between the air cell cathode layers and the air cell anode layers, it is possible to prevent accumulation of a corrosion product between the air cell anodes and cathodes, which is produced in a large amount due to elution of an air cell anode metal material into the electrolytic solution during discharge.

Further, since the air cell cathode layers and air cell anode layers are opposed to each other across a part of the electrolytic solution containers so that the electrolytic solution containers have parts that are not sandwiched between the air cell cathode layers and the air cell anode layers, it is possible to cool the electrolytic solution in these parts by supplying air to the airflow spaces. This can moderate an increase of the electrolytic solution temperature due to discharge. In other words, the heat dissipation performance of the air cell stack can be improved. As a result, evaporation of water from the electrolytic solution can be reduced, and accumulation of a corrosion product between the air cell anodes and cathodes can thereby be prevented, which is produced in a large amount due to elution of an air cell anode metal material into the electrolytic solution during discharge.

Further, an increase of the corrosion product concentration in the electrolytic solution can be moderated, and the discharge time of the air cell can thereby be extended.

Although not shown in the figure, also in the above-described second embodiment, the air cell cathode layer of the first electrode unit may be provided over the entire outer surface of the airflow plane of the electrically conductive base. Further, the air cell cathode layers of the third electrode units may be provided over the entire outer surfaces on one side of the electrically conductive bases, and the air cell anode layers of the third electrode units may be provided over the entire outer surfaces on the other side. Further, the air cell anode layer of the second electrode unit may be provided over the entire outer surface of the electrically conductive base. However, when such electrode units fit in the first insulating frames, it is difficult to utilize the fitted parts in the cell reaction. Further, utilization of the fitted parts in the cell reaction may decrease the joining strength. Therefore, it is preferred that the air cell cathode layer of the first electrode unit is provided on a part of the outer surface of the airflow plane of the electrically conductive base. Further, it is preferred that the air cell cathode layers of the third electrode units may be provided on a part of the outer surfaces on one side of the electrically conductive bases, and the air cell anode layers of the third electrode units may be provided on a part of the outer surfaces on the other side. Further, it is preferred that the air cell anode layer of the second electrode unit is provided on a part of the outer surface of the electrically conductive base.

Although not shown in the figure, in the above-described second embodiment, it is not essential that the first insulating frames include the steps for fitting the first electrode unit, the second electrode unit and the third electrode units. However, since the fitted electrode units can be joined more firmly, it is preferred that the first insulating frames include the step for fitting the first electrode unit, the step for fitting the second electrode unit and the steps for fitting the third electrode units. Further, although not shown in the figure, only one of the step for fitting the first electrode unit, the step for fitting the second electrode unit and the steps for fitting the third electrode units may be provided.

Regarding the timing of supplying the electrolytic solution in the above-described second embodiment, the air cell stack is desirably of a liquid-activated type, in which the air cell stack is stored with the electrolytic solution containers empty until it becomes necessary to activate the cell stack, and the electrolytic solution is injected just before using the air cell stack. The liquid-activated air cell stack can avoid consumption, transformation or deterioration of the electrolytic solution and the active materials during storage. This enables almost permanent storage, and the air cell stack can therefore be effectively used as an emergency reserve power supply. Further, in this case, the electrolytic solution may be stored as its separate solvent and electrolyte. This can ease the constraint on the material of an electrolytic solution tank.

In the above-described second embodiment, it is not essential that the first electrode unit includes the air cell cathode on a part of the outer surface of the airflow plane of the electrically conductive base, the second electrode unit includes the air cell anode on a part of the outer surface of the electrically conductive base, and the first insulating frames have open areas that are larger than the electrode area of non-smaller one between the air cell cathodes and the air cell anodes. However, when the predetermined first electrode unit and the second electrode unit are joined together by the first insulating frames, it is preferred that the first insulating frames have open areas that are larger than the electrode area of non-smaller one between the air cell cathodes and the air cell anodes. With this configuration, the electrode units can be joined firmly.

In the above-described second embodiment, in terms of symmetry of the electrode structure and standardization of the components thereof, it is preferred that the first electrode unit is provided only at one end in the direction in which the air cell cathode layers and the air cell anode layers are opposed to each other, in other words, in the thickness direction (or the unit stacking direction), and the second electrode unit is provided only at the other end in the direction in which the air cell cathode layers and the air cell anode layers are opposed to each other.

Also in the above-described second embodiment, it is preferred that the electrode area of an air cell cathode is larger than the electrode area of an air cell anode opposed to the air cell cathode. This is because the activity of the reaction is lower in the air cell cathodes than in the air cell anodes. With this configuration, the difference in reaction activity between the electrodes is less likely to limit the cell performance.

Third Embodiment

Next, a few examples of an electrode structure and an air cell according to a third embodiment will be described referring to the drawings.

Figure 10A:
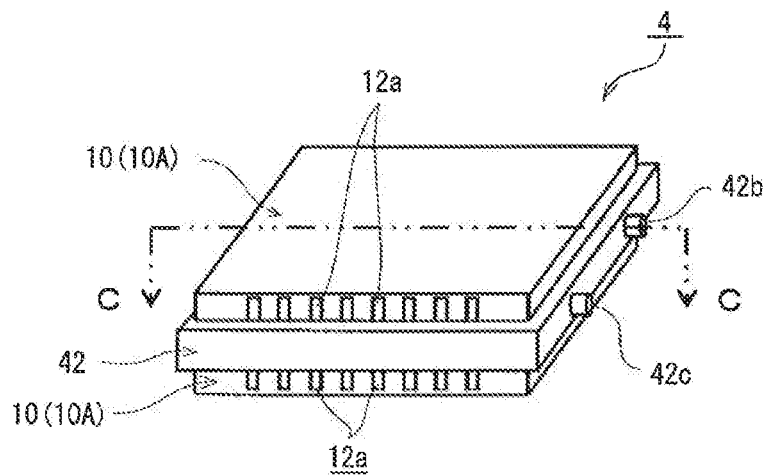
FIG. 10A is a perspective view of an example of an electrode structure according to a third embodiment.
Figure 10B:
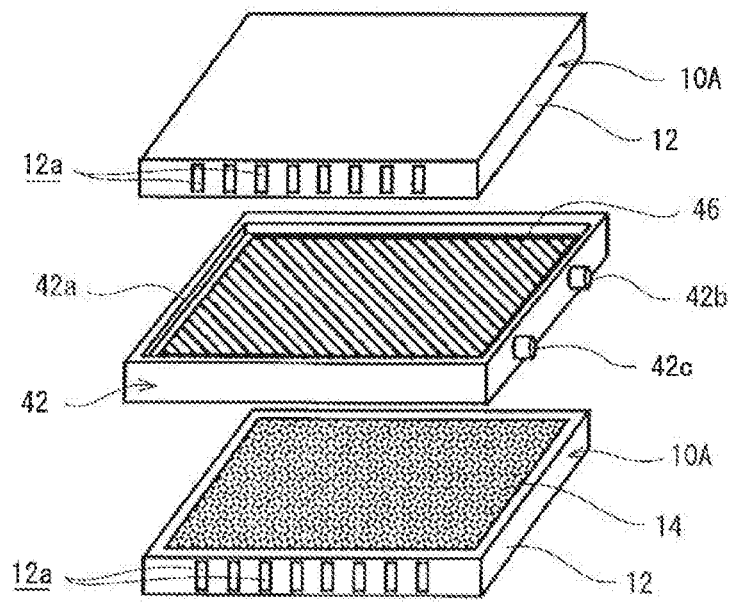
FIG. 10B is an exploded perspective view of the electrode structure of FIG. 10A.
Figure 10C:
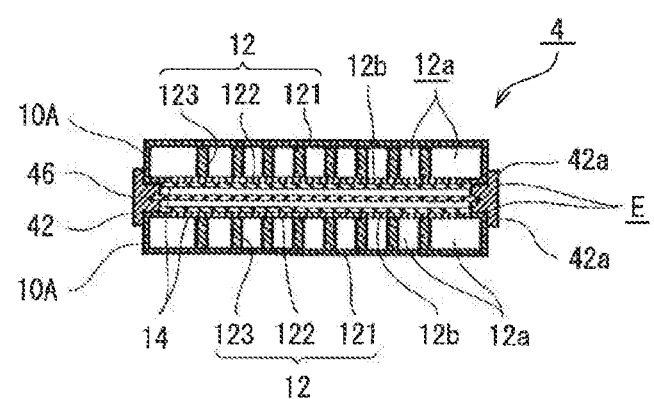
FIG. 10C is a schematic cross sectional view of the electrode structure of FIG. 10A taken along the line C-C.

FIG. 10A is a perspective view of an example of the electrode structure according to the third embodiment. FIG. 10B is an exploded perspective view of the electrode structure of FIG. 10A. FIG. 10C is a schematic cross sectional view of the electrode structure of FIG. 10A taken along the line C-C. The same reference signs are denoted to the same components as those of the above-described embodiments, and the description thereof is omitted.

As illustrated in FIGS. 10A, 10B and 10C, the electrode structure 4 of this example includes two first electrode units 10 and a second insulating frame 42 with an air cell anode layer 46, in which the air cell anode layer 46 is disposed between the two first electrode units 10. The first electrode units 10 are constituted by first-A electrode units 10A. The second insulating frame 42, which includes an air cell anode layer 46 in the frame, spaces and joins the air cell cathode layers 14 of the adjacent two first electrode units 10 to the air cell anode layer 46 such that the air cell cathode layers 14 of the adjacent two first electrode units 10 are opposed to the air cell anode layer 46 across the entire area of electrolytic solution container E. The second insulating frame 42 together with the adjacent two first-A electrode units 10A forms the electrolytic solution container E. In this example, the second insulating frame 42 includes steps (42a, 42a) in which the first-A electrode units 10A fit. Further, in this example, the second insulating frame has a supply opening 42b for supplying electrolytic solution (not shown) to the electrolytic solution containers E and a discharge opening 42c for discharging gas such as air in the electrolytic solution container E while the electrolytic solution (not shown) is supplied. When the electrolytic solution container E is filled with the electrolytic solution (not shown), the electrode structure 4 of this example operates as an air cell capable of generating electric power.

This configuration forms a bi-cell structure that enables using both surfaces of the air cell anode layer as reaction surfaces. Therefore, the current collecting resistance can be reduced, and the power output can thereby be improved. Also in the air cell with the electrode structure, the current collecting resistance can be reduced, and the power output can thereby be improved. When the electrode structure has the bi-cell structure, for example, a terminal (not shown) may be drawn to the outside for connection.

Next, each of the components will be described in detail.

The second insulating frame 42, which is made of an electrically insulating material such as resin for example, spaces and joins the air cell cathode layers 14 of the first-A electrode units 10A to the air cell anode layer 46 such that the air cell cathode layers 14 of the first-A electrode units 10A are opposed to the air cell anode layer 46 disposed in the frame. The second insulating frame 42 forms the electrolytic solution container E between the air cell cathode layers 14 and the air cell anode layer 46. On the side surface, the first insulating frame 42 has a supply opening 42b for supplying the electrolytic solution (not shown) to the electrolytic solution container E and a discharge opening 42c for discharging gas such as air in the electrolytic solution container E while the electrolytic solution (not shown) is supplied. Further, the second insulating frame 42 includes steps 42a in the inner side surface thereof, in which the first-A electrode units 10A fit. The steps (42a, 42a) can be provided by forming a ridge in the inner side surface of the first insulating frame. By fitting the first-A electrode units 10A in the steps (42a, 42a), they can be joined more firmly compared to a frame without any step.

The air cell anode layer 46 may have, for example, the same configuration as the above-described air cell anode layer 26.

Figure 11A:
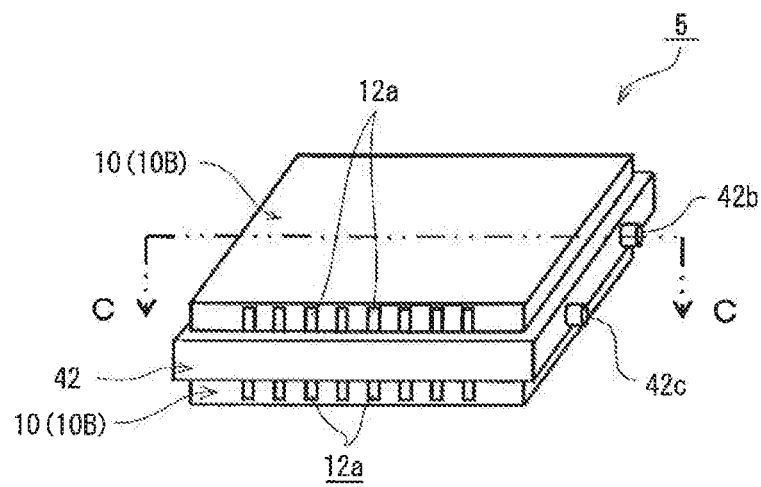
FIG. 11A is a perspective view of another example of the electrode structure according to the third embodiment.
Figure 11B:
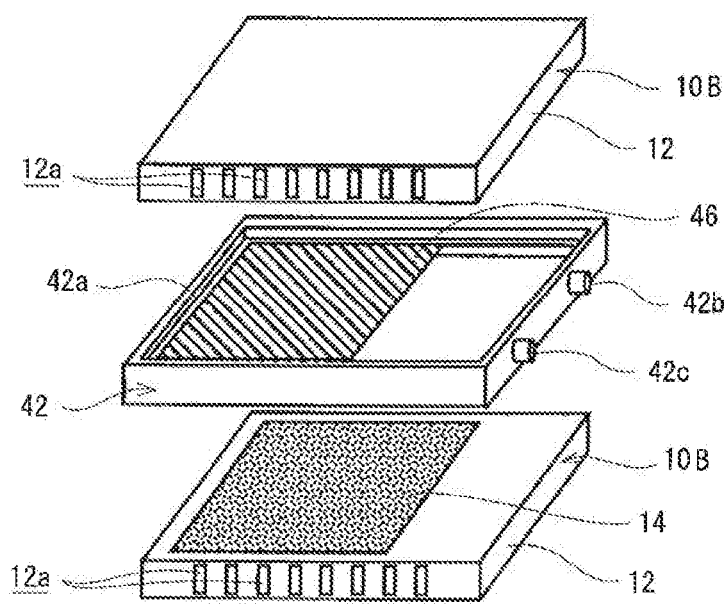
FIG. 11B is an exploded perspective view of the electrode structure of FIG. 11A, and the FIG. 11C is a schematic cross sectional view of the electrode structure of FIG. 11A taken along the line C-C.
Figure 11C:
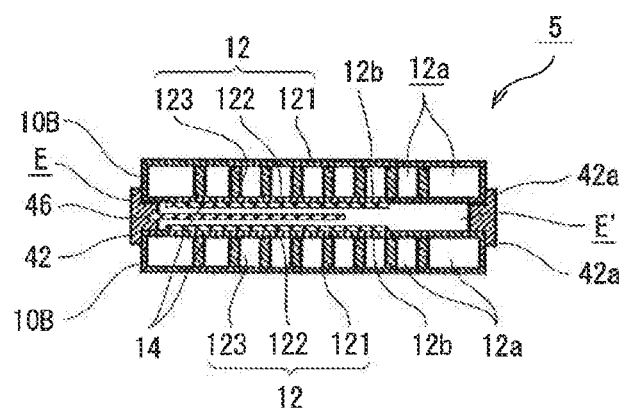

FIG. 11A is a perspective view of another example of the electrode structure according to the third embodiment. FIG. 11B is an exploded perspective view of the electrode structure of FIG. 11A. FIG. 11C is a schematic cross sectional view of the electrode structure of FIG. 11A taken along the line C-C. The same reference signs are denoted to the same components as those of the above-described embodiments, and the description thereof is omitted.

As illustrated in FIGS. 11A, 11B and 11C, the electrode structure 5 of this example includes two first electrode units 10 and a second insulating frame 42 with an air cell anode layer 46, in which the air cell anode layer 46 is disposed between the two first electrode units 10. The first electrode units 10 are constituted by first-B electrode units 10B. The second insulating frame 42 includes an air cell anode layer 46 in a part of the inner area of the frame. The second insulating frame 42 spaces and joins the air cell cathode layers 14 of the adjacent two first electrode units 10 to the air cell anode layer 46 such that the air cell cathode layers 14 of the adjacent two first electrode units 10 are opposed to the air cell anode layer 46 across a part of an electrolytic solution container E. The second insulating frame 42 together with the adjacent two first-B electrode units 10B forms the electrolytic solution container E. In the figures, the part of the electrolytic solution container E that is not sandwiched between the air cell cathode layers 14 and the air cell anode layer 46 is denoted as E'. Also in this example, the second insulating frame 42 has steps (42a, 42a) in which the first-B electrode units 10B fit. Further, also in this example, the second insulating frame 42 has a supply opening 42b for supplying electrolytic solution (not shown) to the electrolytic solution container E and a discharge opening 42c for discharging gas such as air in the electrolytic solution container E while the electrolytic solution (not shown) is supplied. When the electrolytic solution container E is filled with the electrolytic solution (not shown), the electrode structure 5 of this example operates as an air cell capable of generating electric power.

This configuration forms a bi-cell structure that enables using both surfaces of the air cell anode layer as reaction surfaces. Therefore, the current collecting resistance can be reduced, and the power output can thereby be improved. Also in the air cell with the electrode structure, the current collecting resistance can be reduced, and the power output can thereby be improved. When the electrode structure has the bi-cell structure, for example, a terminal (not shown) may be drawn to the outside for connection.

Since the air cell cathode layers and air cell anode layer are opposed to each other across a part of the electrolytic solution container so that the electrolytic solution container has a part that is not sandwiched between the air cell cathode layers and the air cell anode layer, it is possible to prevent accumulation of a corrosion product between the air cell anode and cathodes, which is produced in a large amount due to elution of an air cell anode metal material into the electrolytic solution during discharge.

Further, the air cell cathode layers and air cell anode layer are opposed to each other across a part of the electrolytic solution container so that the electrolytic solution container has a part that are not sandwiched between the air cell cathode layers and the air cell anode layer, it is possible to cool the electrolytic solution in this part by supplying air to the airflow spaces. This can moderate an increase of the electrolytic solution temperature due to discharge. In other words, the heat dissipation performance of the air cell can be improved. As a result, evaporation of water from the electrolytic solution can be reduced, and accumulation of a corrosion product between the air cell anode and cathodes can thereby be prevented, which is produced in a large amount due to elution of an air cell anode metal material into the electrolytic solution during discharge.

Further, an increase of the corrosion product concentration in the electrolytic solution can be moderated, and the discharge time of the air cell can thereby be extended.

Although not shown in the figure, in the above-described third embodiment, the air cell cathode layers may be provided over the entire outer surfaces of the airflow planes of the electrically conductive bases of the first electrode units.

However, when such electrode units fit in the second insulating frame, it is difficult to utilize the fitted parts in the cell reaction. Further, utilization of the fitted parts in the cell reaction may decrease the joining strength. Therefore, it is preferred that the air cell cathode layers are provided on a part of the outer surfaces of the airflow planes of electrically conductive bases of the first electrode units.

Although not shown in the figure, in the above-described third embodiment, it is not essential that the second insulating frame includes the steps in which the first electrode units fit. However, since the fitted first electrode units can be joined more firmly, it is preferred that the second insulating frame includes the steps in which the first electrode units fit.

Further, although not shown in the figure, in the above-described third embodiment, the first electrode units may include another airflow plane with an airflow portion on a plane opposite the airflow plane of the electrically conductive base, and an air cell cathode layer is provided on all or part of the outer surface of the airflow plane.

Regarding the timing of supplying the electrolytic solution in the above-described third embodiment, the air cell is desirably of a liquid-activated type, in which the air cell is stored with the electrolytic solution container empty until it becomes necessary to activate the cell, and the electrolytic solution is injected just before using the air cell. The liquid-activated air cell can avoid consumption, transformation or deterioration of the electrolytic solution and the active materials during storage. This enables almost permanent storage, and the cell can therefore be effectively used as an emergency reserve power supply. Further, in this case, the electrolytic solution may be stored as its separate solvent and electrolyte. This can ease the constraint on the material of an electrolytic solution tank.

In the above-described third embodiment, it is not essential that the first electrode units include the air cell cathodes on a part of the outer surfaces of the airflow planes of the electrically conductive bases, and the second insulating frame includes the air cell anode in a part of the inner area of the frame and has an open area that is larger than the electrode area of non-smaller one between the air cell cathodes and the air cell anode. However, when the predetermined first electrode units are joined together by the second insulating frame, it is preferred that the second insulating frame has an open area that is larger than the electrode area of non-smaller one between the air cell cathodes and the air cell anode. With this configuration, the electrode units can be joined firmly.

In the above-described third embodiment, it is preferred that the electrode area of the air cell cathodes is larger than the electrode area of the air cell anode opposed to the air cell cathodes. This is because the activity of the reaction is lower in the air cell cathodes than in the air cell anodes. With this configuration, the difference in reaction activity between the electrodes is less likely to limit the cell performance.

Fourth Embodiment

Next, a few examples of an electrode structure and an air cell stack according to a fourth embodiment will be described referring to the drawings.

Figure 12:
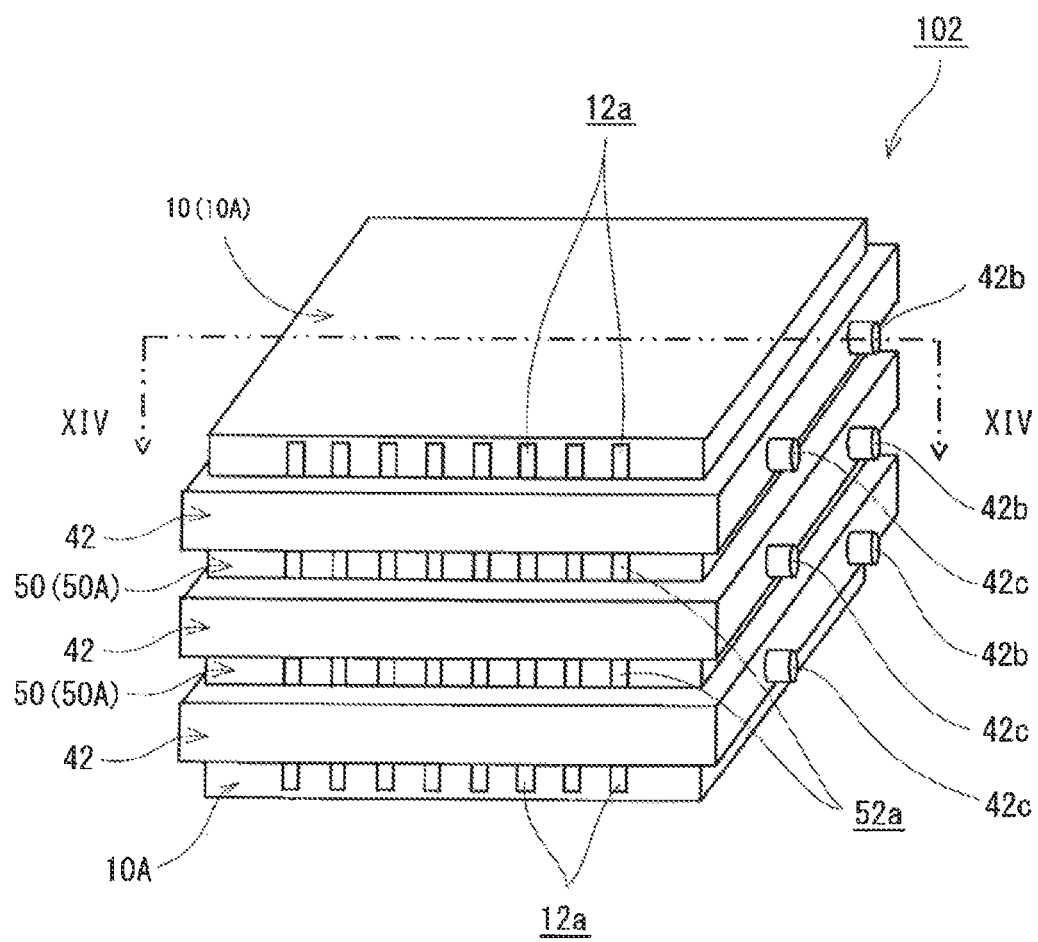
FIG. 12 is a perspective view of an example of an electrode structure according to a fourth embodiment.
Figure 13:
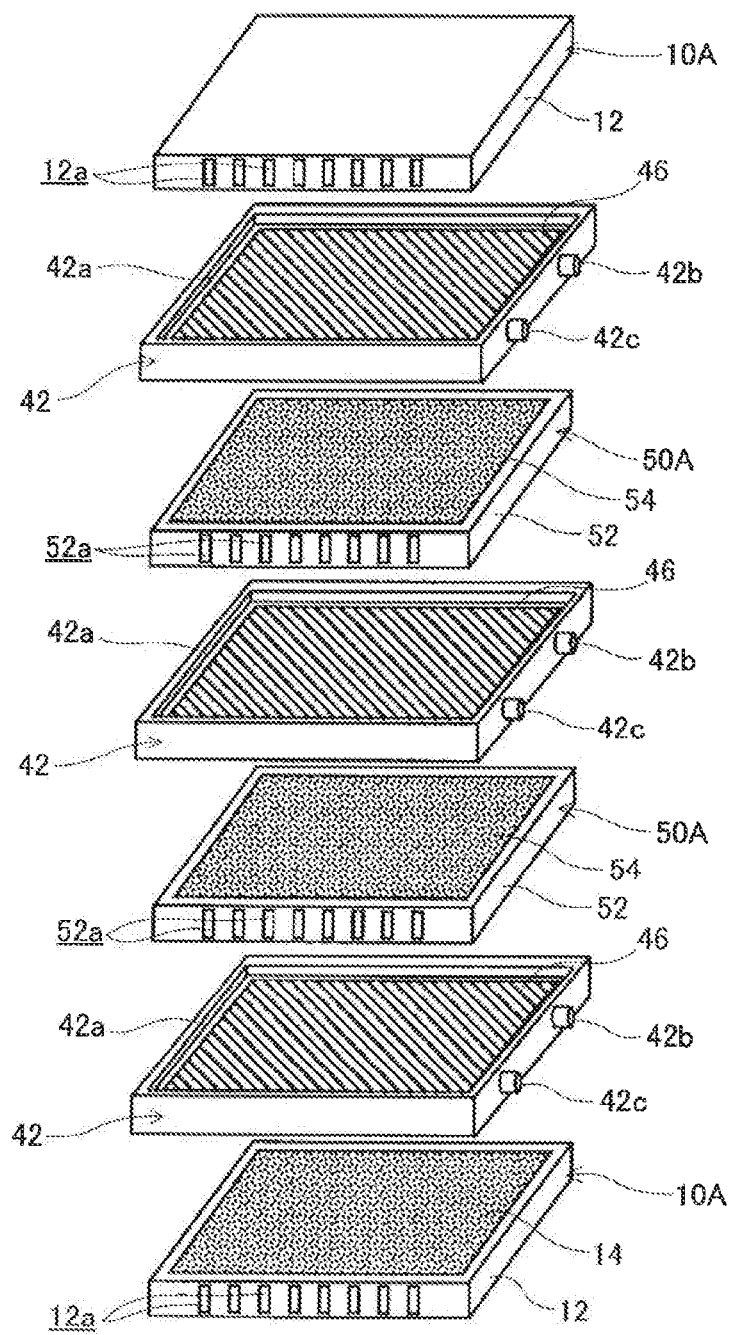
FIG. 13 is an exploded perspective view of the electrode structure of FIG. 12.
Figure 14:
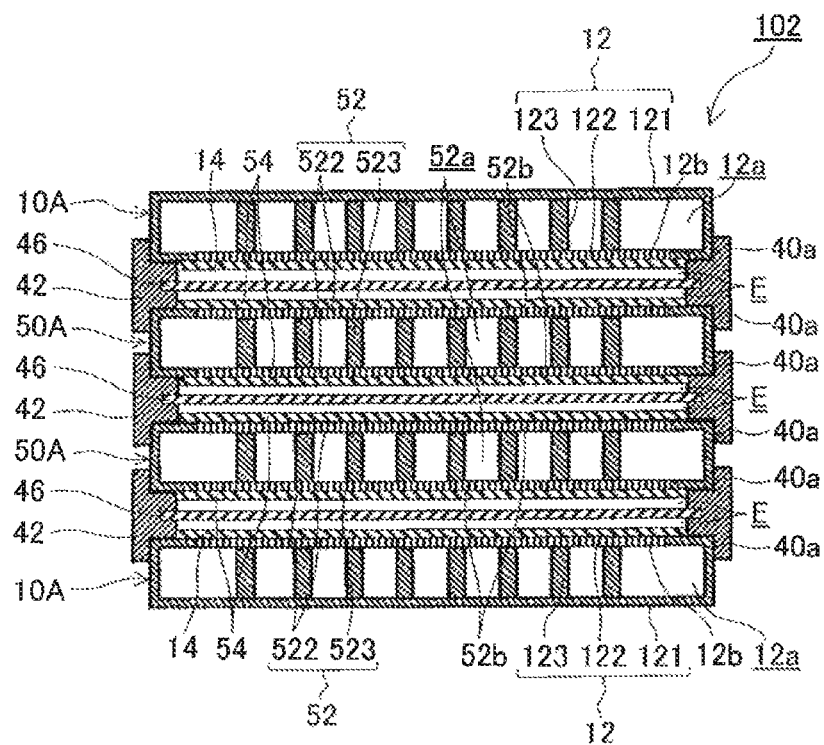
FIG. 14 is a schematic cross sectional view of the electrode structure of FIG. 12 taken along the line XIV-XIV.

FIG. 12 is a perspective view of an example of the electrode structure according to the fourth embodiment. FIG. 13 is an exploded perspective view of the electrode structure of FIG. 12. FIG. 14 is a schematic cross sectional view of the electrode structure of FIG. 12 taken along the line XIV-XIV. The same reference signs are denoted to the same components as those of the above-described embodiments, and the description thereof is omitted.

As illustrated in FIG. 12 to FIG. 14, the electrode structure 102 of this example includes two first electrode units 10, two fourth electrode units 50 disposed between the two first electrode units 10 and three second insulating frames 42 with air cell anode layers 46, in which the air cell anode layers 46 are disposed between the electrode units (10, 50). The first electrode units 10 are constituted by first-A electrode units 10A. Each of the fourth electrode units 50 (hereinafter also referred to as the "fourth-A electrode units 50A") has an airflow space 52a therein and includes a base 52 with mutually opposed airflow planes 52b and air cell cathode layers 54 disposed on the outer surfaces of the respective airflow planes 52b. The second insulating frames 42, each of which includes an air cell anode layer 46 in the frame, space and join the air cell cathode layers (14, 54) of adjacent electrode units (10, 50) to the air cell anode layers 46 such that the air cell cathode layers (14, 54) of adjacent electrode units (10, 50) are opposed to the air cell anode layers 46 across the entire area of the electrolytic solution containers E. The second insulating frames 42 together with the adjacent electrode units (10, 50) form the electrolytic solution containers E. Also in this example, each of the second insulating frames 42 have steps (42a, 42a) in which the first-A electrode units 10A and the fourth-A electrode units 50A fit. Further, also in this example, each of the second insulating frames 42 has a supply opening 42b for supplying electrolytic solution (not shown) to the electrolytic solution containers E and a discharge opening 42c for discharging gas such as air in the electrolytic solution containers E while the electrolytic solution is supplied. When the electrolytic solution containers E are filled with electrolytic solution (not shown), the electrode structure 102 of this example operates as an air cell stack capable of generating electric power.

This configuration forms a bi-cell structure that enables utilizing both surfaces of the air cell anode layers as reaction surfaces. Therefore, the current collecting resistance can be reduced, and the power output can thereby be improved. Also in the air cell stack with the electrode structure, the current collecting resistance can be reduced, and the power output can thereby be improved. When the electrode structure has the bi-cell structure, for example, a terminal (not shown) may be drawn to the outside for connection.

FIG. 12 to FIG. 14 illustrate an example in which the stack is composed of six cells using four electrode units. However, it should be understood well that a stack composed of more cells can be formed by disposing another fourth electrode unit and another second insulating frame with an air cell anode layer between the above-described electrode units. By inserting an additional four electrode unit and an additional second insulating frame with an air cell anode, the output performance can be adjusted according to an intended use.

Next, each of the components will be described in detail.

The bases 52 are not particularly limited and may be any base that electrically insulates the air cell cathodes on the outer surfaces of the respective airflow planes from each other and also has a function of supporting the air cell cathodes and a function as an air channel that is formed by the airflow space 52a and the airflow planes 52b and enables supplying an oxygen-containing gas such as air to the air cell cathode layers 54. For example, the outer shape of the bases 52 is not limited to a rectangular plate shape and may be a disk shape or even a non-plate shape instead. The airflow spaces 52a can be provided, for example, by joining metal gas-permeable plates 522 to each other by ribs 523 of, for example, the same resin as the insulating frames so as to form a box base. Further, it is preferred that the airflow planes 52*b* is provided, for example, by using as the gas-permeable metal plates 522 foam metal plates, etched metal plates, punched metal plates or the like having a plurality of micro pores as airflow portions.

The air cell cathode layers 54 may have, for example, the same configuration as the above-described air cell cathode layer 14.

Figure 15:
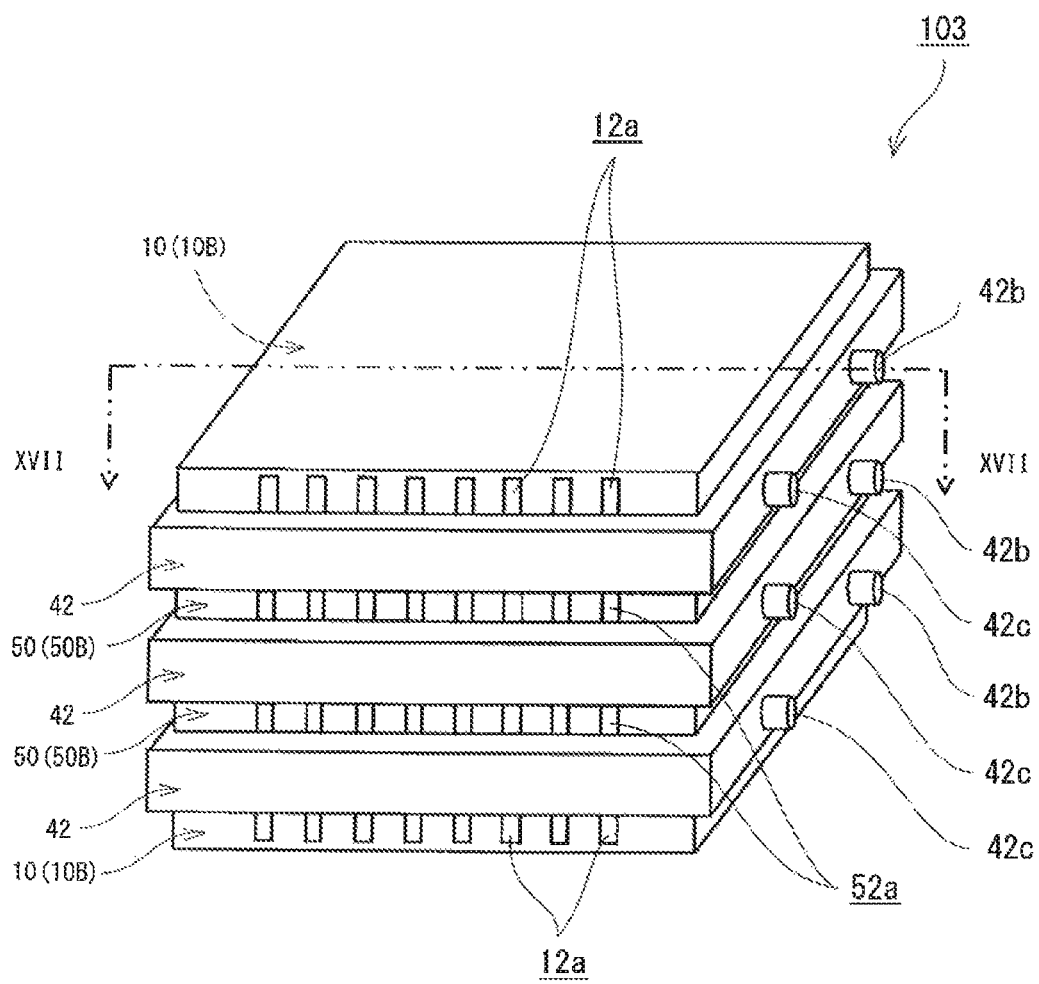
FIG. 15 is a perspective view of another example of the electrode structure according to the fourth embodiment.
Figure 16:
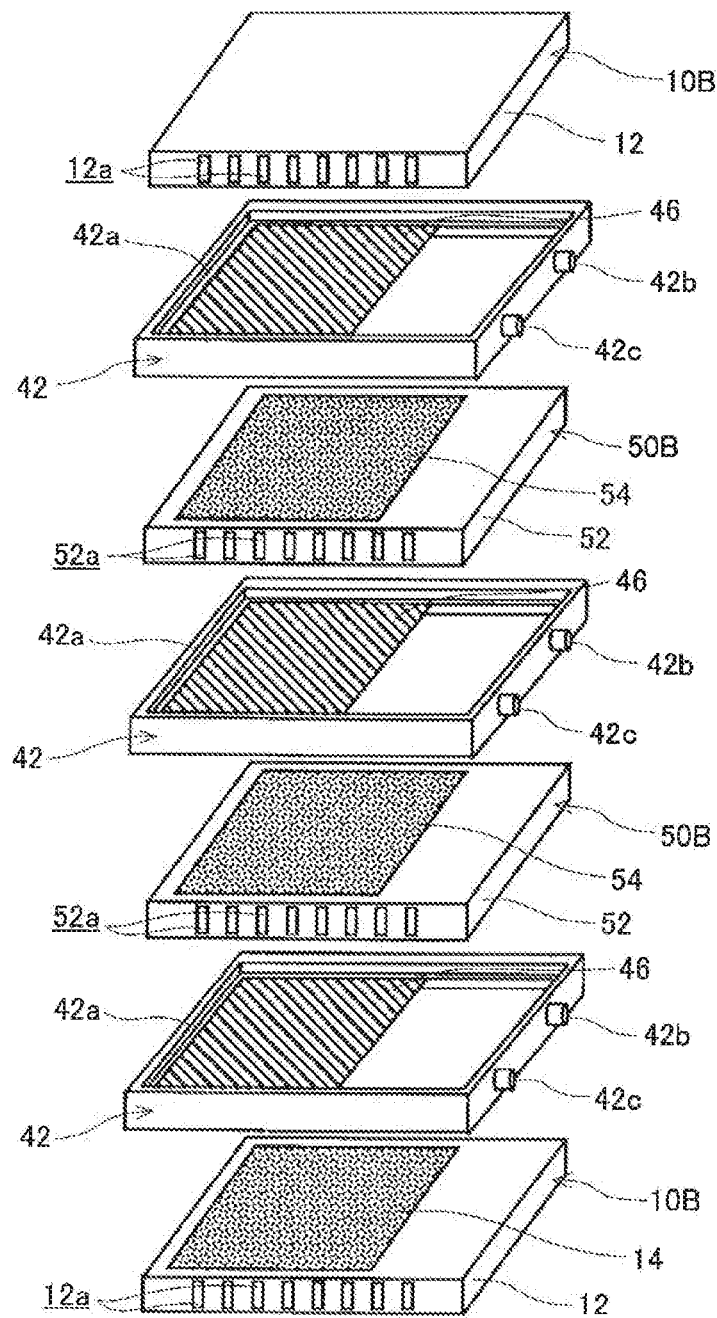
FIG. 16 is an exploded perspective view of the electrode structure of FIG. 15.
Figure 17:
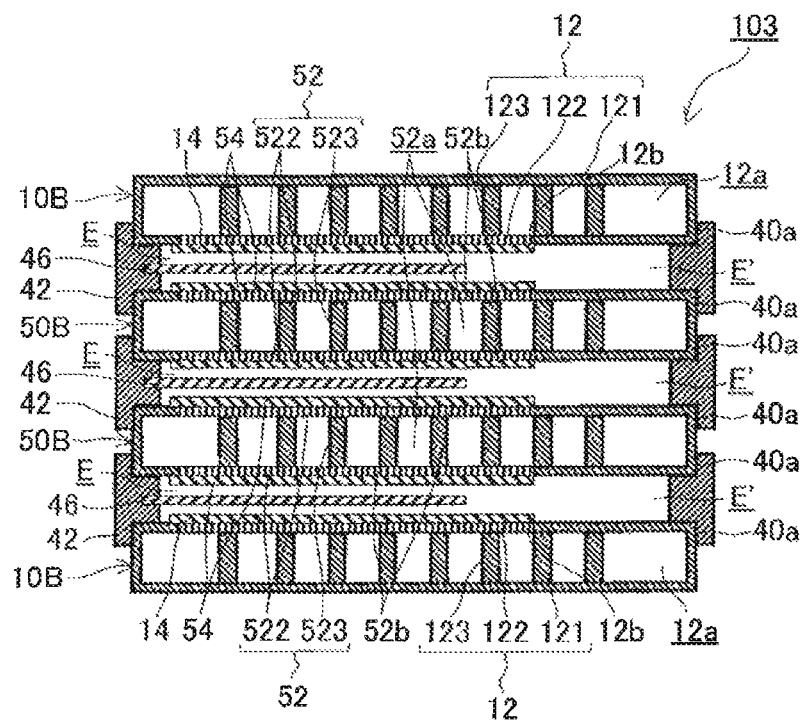
FIG. 17 is a schematic cross sectional view of the electrode structure of FIG. 15 taken along the line XVII-XVII.

FIG. 15 is a perspective view of another example of the electrode structure according to the fourth embodiment. FIG. 16 is an exploded perspective view of the electrode structure of FIG. 15. FIG. 17 is a schematic cross sectional view of the electrode structure of FIG. 15 taken along the line XVII-XVII. The same reference signs are denoted to the same components as those of the above-described embodiments, and the description thereof is omitted.

As illustrated in FIG. 15 to FIG. 17, the electrode structure 103 of this example includes two first electrode units 10, two fourth electrode units 50 disposed between the two first electrode units 10 and three second insulating frames 42 with air cell anode layers 46, in which the air cell anode layers 46 are disposed between the electrode units (10, 50). The first electrode units 10 are constituted by the first-B electrode units 10B. Each of the fourth electrode units 50 (hereinafter also referred to as the "fourth-B electrode units 50B") has an airflow spaces 52*a* therein and includes a non-conductive base 52 with mutually opposed airflow planes 52*b* and air cell cathode layers 54 in a part of the outer surfaces of the respective airflow planes 52*b*. The second insulating frames 42, each of which includes an air cell anode layer 46 in the frame, space and join the air cell cathode layers (14, 54) of adjacent electrode units (10, 50) to the air cell anode layers 46 such that the air cell cathode layers (14, 54) of the adjacent electrode units (10, 50) are opposed to the air cell anode layers 46 across a part of an electrolytic solution containers E. The second insulating frames 42 together with the adjacent electrode units (10, 50) form electrolytic solution containers E. In the figures, the parts of the electrolytic solution containers E that are not sandwiched between the air cell cathode layers 14 and the air cell anode layers 46 are denoted as E'. Also in this example, each of the second insulating frames 42 has steps (42*a*, 42*a*) in which the first-B electrode units 10B and the fourth-B electrode units 50B fit. Further, also in this example, each of the second insulating frames 42 has a supply opening 42*b* for supplying electrolytic solution (not shown) to the electrolytic solution containers E and a discharge opening 42*c* for discharging gas such as air in the electrolytic solution containers E while the electrolytic solution is supplied. When the electrolytic solution containers E are filled with the electrolytic solution (not shown), the electrode structure 103 of this example operates as an air cell stack capable of generating electric power.

This configuration forms a bi-cell structure that enables utilizing both surfaces of the air cell anode layers as reaction surfaces. Therefore, the current collecting resistance can be reduced, and the power output can thereby be improved. Also in the air cell stack with the electrode structure, the current collecting resistance can be reduced, and the power output can thereby be improved. When the electrode structure has the bi-cell structure, for example, a terminal (not shown) may be drawn to the outside for connection.

FIG. 15 to FIG. 17 illustrate an example in which the stack is composed of six cells using four electrode units. However, it should be understood well that a stack composed of more cells can be formed by disposing another fourth electrode unit and another second insulating frame with an air cell anode layer between the above-described electrode units. By inserting an additional four electrode unit and an additional second insulating frame with an air cell anode, the output performance can be adjusted according to an intended use.

Since the air cell cathode layers and air cell anode layers are opposed to each other across a part of the electrolytic solution containers so that the electrolytic solution containers have parts that are not sandwiched between the air cell cathode layers and the air cell anode layer, it is possible to prevent accumulation of a corrosion product between the air cell anodes and cathodes, which is produced in a large amount due to elution of an air cell anode metal material into the electrolytic solution during discharge.

Further, since the air cell cathode layers and air cell anode layers are opposed to each other across a part of the electrolytic solution containers so that the electrolytic solution containers have parts that are not sandwiched between the air cell cathode layers and the air cell anode layer, it is possible to cool the electrolytic solution in these parts by supplying air to the airflow spaces. This can moderate an increase of the electrolytic solution temperature due to discharge. In other words, the heat dissipation performance of the air cell stack can be improved. As a result, evaporation of water from the electrolytic solution can be reduced, and accumulation of a corrosion product between the air cell anode and cathodes can thereby be prevented, which is produced in a large amount due to elution of an air cell anode metal material into the electrolytic solution during discharge.

Further, an increase of the corrosion product concentration in the electrolytic solution can be moderated, and the discharge time of the air cell stack can thereby be extended.

Although not shown in the figure, also in the above-described fourth embodiment, the air cell cathode layers of the first electrode units may be provided over the entire outer surfaces of the airflow planes of the electrically conductive bases. Further, the air cell anode layers of the fourth electrode units may be provided over the entire outer faces of the airflow planes of the bases. However, when such electrode units fit in second insulating frames, it is difficult to utilize the fitted parts in the cell reaction. Further, utilization of the fitted parts in the cell reaction may decrease the joining strength. Therefore, it is preferred that the air cell cathode layers of the first electrode units are provided on a part of the outer surfaces of the airflow planes of electrically conductive bases. Further, it is preferred that the air cell cathode layers of the fourth electrode units are provided on a part of the outer surfaces of the airflow planes of the bases.

Although not shown in the figure, in the above-described fourth embodiment, it is not essential that the second insulating frames include the steps in which the first electrode units and the fourth electrode units fit. However, since the fitted electrode units can be joined firmly, it is preferred that the second insulating frames include the steps in which the first electrode units fit and the step in which the fourth electrode units fits. Further, although not shown in the figure, the second insulating frames may include only either of the steps for fitting the first electrode units or the steps for fitting the fourth electrode units.

Regarding the timing of supplying the electrolytic solution in the above-described fourth embodiment, the air cell stack is desirably of a liquid-activated type, in which the air cell stack is stored with the electrolytic solution containers E empty until it becomes necessary to activate the cell stack, and the electrolytic solution is injected just before using the air cell stack. The liquid-activated air cell stack can avoid consumption, transformation or deterioration of the electrolytic solution and the active materials during storage. This enables almost permanent storage, and the cell stack can therefore be effectively used as an emergency reserve power supply. Further, in this case, the electrolytic solution may be stored as its separate solvent and electrolyte. This can ease the constraint on the material of an electrolytic solution tank.

In the above-described fourth embodiment, it is not essential that: the first electrode units include the air cell cathodes on a part of the outer surfaces of the airflow planes of the electrically conductive bases; the fourth electrode units include the air cell anodes on a part of the outer surfaces of the airflow planes of the predetermined bases; and the second insulating frames include the air cell anodes in a part of the inner areas of the frames and have open areas that are larger than the electrode area of non-smaller one between the air cell cathodes and the air cell anodes. However, when the predetermined first electrode units and the fourth electrode units are joined together by the second insulating frames, it is preferred that the second insulating frames have open areas that are larger than the electrode area of non-smaller one between the air cell cathodes and the air cell anode. With this configuration, the electrode units can be joined firmly.

In the above-described fourth embodiment, it is preferred that the electrode area of an air cell cathode is larger than the electrode area of an air cell anode that is opposed to the air cell cathode. This is because the activity of the reaction is lower in the air cell cathodes than in the air cell anodes. With this configuration, the difference in reaction activity between the electrodes is less likely to limit the cell performance.

EXAMPLES

Hereinafter, the present invention will be described in more detail with examples and comparative examples.

Example 1

(1) Preparation of Electrode Unit

To make electrically conductive bases 32 (12, 22), a nickel plate of 0.1 mm in thickness, 100 mm in length and 100 mm in width (corresponding to a non-gas permeable plate 321 (121, 221)) and a nickel plate of the same size with 0.2 mm chemically etched micro pores are formed in a checkered pattern in the center area of 90 mm in length and 90 mm in width (corresponding to a gas-permeable plate 322 (122, 222)) were prepared. These two plates were joined to each other by ribs with of 1.2 mm in height (corresponding to ribs 323 (223, 123)) so that each electrically conductive base 32 (12, 22) was prepared.

On the surfaces (lower surface in FIG. 6) of the non-gas permeable nickel plates of each of the obtained electrically conductive bases 32, 22, a zinc plate of 0.1 mm in thickness, 94 mm in length and 94 mm in width was pasted by an electrically conductive adhesive as air cell anode layers 36, 26. The lowermost electrode unit 12 is not provided with an air cell anode layer (see FIG. 6).

On the surface (upper surface in FIG. 6) of the nickel gas-permeable plate of each of the electrically conductive bases 32, 12, an electrically conductive water repellent layer and an air cell cathode layer 34, 14 thereon are baked in the micro pore etched area. The electrically conductive water repellent layer was composed of 1.5 parts by weight of acetylene black (HS100, Denki Kagaku Kogyo K. K.), 3.5 parts by weight of graphite (SP20, Nippon Graphite Industries, Ltd.), 5 parts by weight of PTFE (polytetrafluoroethylene). The air cell cathode layer 34, 14 was composed of 2.5 parts by weight of acetylene black (HS100, Denki Kagaku Kogyo K. K.), 2.5 parts by weight of graphite (SP20, Nippon Graphite Industries, Ltd.), 1.0 part by weight of Ketjen Black, 2 parts by weight of $MnO_2$ (manganese dioxide, Japan Metals & Chemicals Co., Ltd.), 1 part by weight of colloidal silica and 1 part by weight of PTFE. The uppermost electrode unit 22 was not provided with an air cell cathode layer (see FIG. 6).

(2) Preparation of Insulating Frame

Insulating frames 40 were prepared, each of which was made of polypropylene, and as illustrated in FIG. 5 and FIG. 6, had a frame shape with a T cross section, had a supply opening 40b and a discharge opening 40c for electrolytic solution in the outer side surface and included steps 40a on both upper and lower surfaces for fitting the electrode units with the above-described size.

(3) Assembly of Air Cell Stack

Eleven electrode units having the above-described structure, which were specifically one first-B electrode unit 10B, nine third-A electrode units 30A and one second-B electrode unit 20B, and ten insulating frames 40 were prepared. They were alternately stacked such that the air cell cathode layers and the air cell anode layers of the electrode units were opposed to each other. An air cell stack composed of ten cells was thus obtained. In the stacking process, a primer was applied to the steps 40a of the insulating frames 40, and thereafter a modified acrylic silicone adhesive (Super X, Cemedine Co., Ltd.) was further applied thereto by using a dispenser, so that the electrode units (10B, 20B, 30A) and the insulating frames 40 were joined to each other.

(Comparative Example 1)

Figure 19:
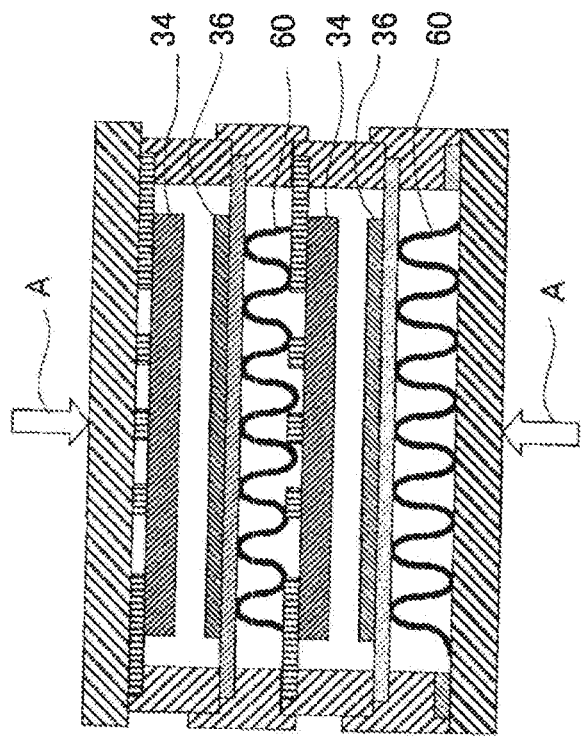
FIG. 19 is a schematic partial cross sectional view of the air cell stack of Comparative example 1.

Ten cells were stacked, which included the air cell anode layers 36 composed of the same material and having the same size as above and the air cell cathode layers 34 composed of the same material and having the same size as above. As illustrated in FIG. 19 (which schematically illustrates a stack structure composed of only two cells for descriptive reasons), the cells were connected to each other by current collectors 60 of corrugated metal thin plates. An air cell stack of the comparative example was thus obtained.

(Evaluation of Performance)

(1) Intercell Current Collecting Resistance

The intercell current collecting resistance was measured under a fastening pressure of 0.5 MPa in the arrow direction A for the non-inventive air cell stack of Comparative example 1, which was composed of ten cells and had a stack structure as illustrated in FIG. 19. It was 500 mΩ·cm². In contrast, it was observed that the inventive air cell stack of Example 1 exhibited an intercell current collecting resistance (fastening pressure: 0) of only 150 mΩ·cm².

(2) Power Generation Performance

Figure 18:
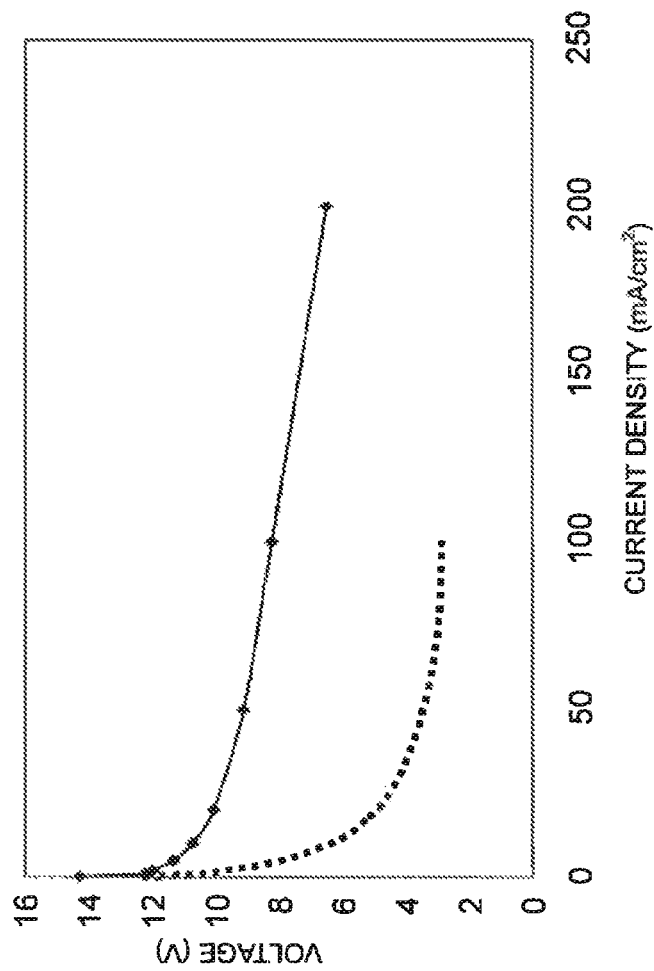
FIG. 18 is a graph illustrating the power generation performance of air cell stacks of Example 1 and Comparative example 1.

The air cell stack of Example 1 and the air cell stack of Comparative example 1 were tested and compared in power generation performance. The test was conducted by using 8M KOH aqueous solution as electrolytic solution. The temperature was held at room temperature, and the air supply rate was set at 60 L per minute. The results obtained are shown in FIG. 18. As illustrated in FIG. 18, it was observed that, the inventive air cell stack of Example 1 (illustrated by the solid lines) exhibited a voltage of approximately 8V at a current density of 100 mA/cm² for example, while the non-inventive air cell stack of Comparative example 1 (illustrated by the dotted lines) exhibited a voltage of merely 3 V at the same current density.

Example 2-1

(1) Preparation of Electrode Unit

To make an electrically conductive base 12, a nickel plate of 0.1 mm in thickness, 100 mm in length and 100 mm in width, which partly had chemically etched 0.2 mm micro pores formed in a checkered pattern for supplying air to an air cell cathode layer, (corresponding to the gas-permeable plate 122) and an aluminum plate of 1 mm in thickness, 100 mm in length and 100 mm in width (corresponding to the non-gas permeable plate 121) and aluminum ribs of 1.2 mm in height (corresponding to the ribs 123) were prepared. The nickel plate and the aluminum plate were joined together by the ribs of 1.2 mm in height. The electrically conductive base 12 was thus prepared.

On the surface (upper surface in FIGS. 2A, 2B and 2C) of the nickel gas-permeable plate of the electrically conductive base 12 thus obtained, an electrically conductive water repellent layer and an air cell cathode layer 14 thereon were baked in the micro pore etched area. A first-B electrode unit 10B (with a different electrode area) used in this example was thus obtained. The electrically conductive water repellent layer was composed of 1.5 parts by weight of acetylene black (HS100, Denki Kagaku Kogyo K. K.), 3.5 parts by weight of graphite (SP20, Nippon Graphite Industries, Ltd.) and 5 parts by weight of PTFE (polytetrafluoroethylene). The air cell cathode layer 14 was composed of 2.5 parts by weight of acetylene black (HS100, Denki Kagaku Kogyo K. K.), 2.5 parts by weight of graphite (SP20, Nippon Graphite Industries, Ltd.), 1.0 part by weight of Ketjen Black, 2 parts by weight of $MnO_2$ (manganese dioxide, Japan Metals & Chemicals Co., Ltd.), 1 part by weight of colloidal silica and 1 part by weight of PTFE.

To make an electrically conductive base 22, a nickel plate of 0.1 mm in thickness, 100 mm in length and 100 mm in width (corresponding to the non-gas permeable plate 221) and an aluminum plate of 1 mm in thickness, 100 mm in length and 100 mm in width (corresponding to the non-gas permeable plate 221) and aluminum ribs of 1.2 mm in height (corresponding to the ribs 223) were prepared. The nickel plate and the aluminum plate were joined together by the ribs of 1.2 mm in height. The electrically conductive base 22 was thus prepared.

On the surface (lower surface in FIGS. 2A, 2B and 2C) of the nickel non-gas permeable plate of the electrically conductive base 22 thus obtained, a 1 mm-thick magnesium alloy plate was pasted as an air cell anode layer 26 by an electrically conductive adhesive. The second-B electrode unit 20B (with a different electrode area) used in this example was thus obtained. The Q value was 0.8, which is the ratio of the area of the electrode layer 26 formed on the second-B electrode unit 20B to the area of the interface between an electrolytic solution container E formed by the second-B electrode unit 20B and the second-B electrode unit 20B.

(2) Preparation of Insulating Frame

An insulating frame 40 was prepared, which was made of polypropylene, and as illustrated in FIGS. 2A, 2B and 2C, had a frame shape with a T cross section, had a supply opening 40b and a discharge opening 40c for electrolytic solution in the outer side surface and includes steps 40a on both upper and lower surfaces for fitting the electrode units with the above-described size.

(3) Assembly of Air Cell

One first-A electrode unit 10A, one second-A electrode unit 20A and one insulating frame 40 were prepared. They were stacked such that the air cell cathodes and the air cell anode of the electrode units are opposed to each other. An air cell of this example was thus obtained. In the stacking process, a primer was applied on the steps 40a of the insulating frame 40, and thereafter a modified acrylic silicone adhesive (Super X, Cemedine Co., Ltd.) was applied thereon by using a dispenser so that the electrode units (10A, 20A) and the insulating frame 40 were joined to each other.

Example 2-2

An air cell of this example was prepared in the same manner as the preparation of the electrode units of Example 2-1 except that the Q value in the preparation of the electrode units of Example 2-1, which is the ratio of the area of the electrode layer 26 formed on the second-B electrode unit 20B to the area of the interface between the electrolytic solution container E formed by the second-B electrode unit 20B and the second-B electrode unit 20B, was changed to 0.6.

(Evaluation of Performance)

(1) Discharge Performance

The air cells of Example 2-1 and Example 2-2 were tested and compared in the effect of extending the discharge time. The test was conducted by using 4M NaCl aqueous solution as electrolytic solution. The temperature was held at room temperature, and the air supply ratio was set at 60 L per minute. The results obtained are shown in FIG. 20.

Figure 20:
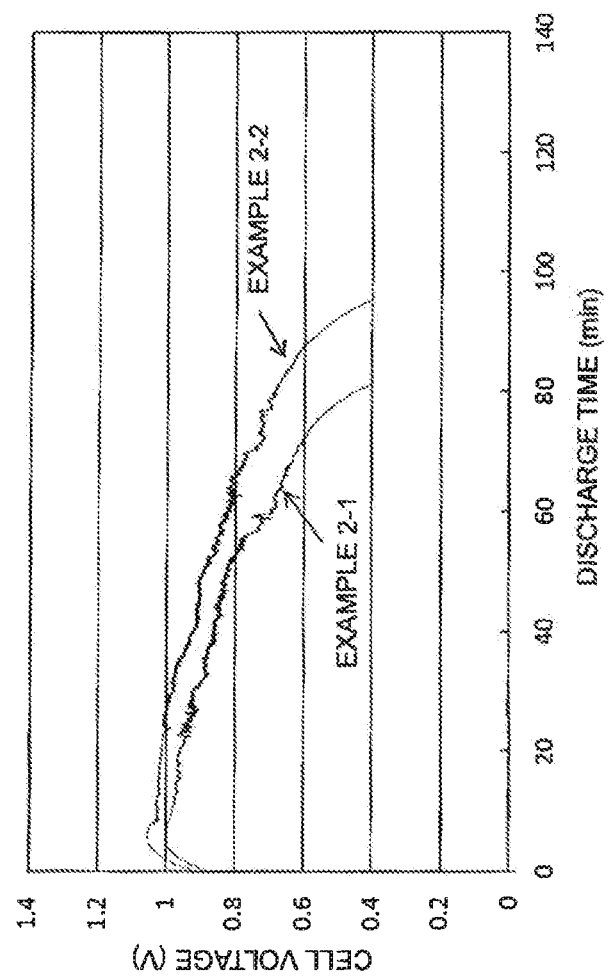
FIG. 20 is a graph illustrating the effect of extending the discharge time in air cells of Example 2-1 and Example 2-2.

As illustrated in FIG. 20, when comparing the discharge time until the cell voltage (illustrated by the solid lines) of the air cells of the examples was reduced to 0.4 V, it can be seen that Example 2-2, which had a comparatively low Q value of 0.6, exhibited a longer discharge time than Example 2-1, which had a comparatively high Q value of 0.8.

While the present invention has been described with a few embodiments and examples, the present invention is not limited thereto, and a variety of changes may be made within the gist of the present invention.

For example, although not shown in the drawings, electrode structures according to the first embodiment may be suitably combined together to be an electrode structure (air cell stack) that includes a plurality of electrolytic solution containers.

REFERENCE SIGNS LIST

1, 2, 3, 4, 5 Electrode structure (air cell)
10 First electrode unit
10A First-A electrode unit
10B First-B electrode unit
12, 22, 23, 32 Electrically conductive base
12a, 22a, 32a, 52a Airflow space
12b, 32b, 52b Airflow plane
32c Surface
14, 34, 54 Air cell cathode layer
26, 36, 46 Air cell anode layer
20 Second electrode unit
20A Second-A electrode unit
20B Second-B electrode unit
20C Second-C electrode unit
30 Third electrode unit
30A Third-A electrode unit
30B Third-B electrode unit
40 First insulating frame
40a, 42a Step 40b, 42b Supply opening
40c, 42c Discharge opening
42 Second insulating frame
50 Fourth electrode unit
50A Fourth-A electrode unit
50B Fourth-B electrode unit
52 Base
60 Current collector
100, 101, 102, 103 Electrode structure (air cell stack)
121, 221, 321 Non-gas permeable plate
122, 222, 322, 522 Gas permeable plate
123, 223, 323, 523 Rib
E, E' Electrolytic solution container

The invention claimed is:

1. An electrode structure, comprising:
a first electrode unit having an airflow space therein and comprising an electrically conductive base with an airflow plane and an air cell cathode disposed on an outer surface of the airflow plane;
a second electrode unit comprising an electrically conductive base and an air cell anode disposed on an outer surface of the electrically conductive base;
at least one third electrode unit disposed between the first electrode unit and the second electrode unit, having an airflow space therein and comprising a box metal electrically conductive base with an airflow plane, an air cell cathode disposed on an outer surface of the airflow plane and an air cell anode disposed on an outer surface of a plane opposite the airflow plane, wherein the box metal electrically conductive base comprises a metal non-gas-permeable plate, a metal gas permeable plate, and metal ribs joining the metal non-gas-permeable plate with the metal gas permeable plate; and
a first insulating frame, the number of which is larger than the number of the third electrode unit by one,
wherein the first, second and third electrode units are adjacent to each other, and
the first insulating frame spaces and joins adjacent electrode units to each other such that an air cell cathode and an air cell anode of the adjacent electrode units are opposed to each other, and the first insulating frame together with the adjacent electrode units forms an electrolytic solution container.

2. The electrode structure according to claim 1,
wherein the first electrode unit has the airflow space therein and comprises the electrically conductive base with the airflow plane and the air cell cathode disposed on a part of the outer surface of the airflow plane,
the second electrode unit comprises the electrically conductive base and the air cell anode disposed on a part of the outer surface of the electrically conductive base,
the third electrode unit has the airflow space therein and comprises the electrically conductive base with the airflow plane, the air cell cathode disposed on a part of the outer surface of the airflow plane and the air cell anode disposed on a part of the outer surface of the plane opposite the airflow plane, and
the first insulating frame comprises an open area that is larger than an electrode area of non-smaller one between the air cell cathode and the air cell anode.

3. The electrode structure according to claim 1,
wherein the first electrode unit is disposed only at one end in a direction in which the air cell cathode and the air cell anode are opposed to each other,
the second electrode unit is disposed only at an other end in the direction in which the air cell cathode and the air cell anode are opposed to each other.

4. The electrode structure according to claim 2,
wherein the first electrode unit is disposed only at one end in a direction in which the air cell cathode and the air cell anode are opposed to each other,
the second electrode unit is disposed only at an other end in the direction in which the air cell cathode and the air cell anode are opposed to each other.

5. The electrode structure according to claim 1, wherein an electrode area of the air cell cathode is larger than an electrode area of the air cell anode that is opposed to the air cell cathode.

6. The electrode structure according to claim 1, wherein the first insulating frame comprises a step in which the first electrode unit, the second electrode unit or the third electrode unit fits.

7. An air cell stack comprising an electrode structure, comprising:
a first electrode unit having an airflow space therein and comprising an electrically conductive base with an airflow plane and an air cell cathode disposed on an outer surface of the airflow plane;
a second electrode unit comprising an electrically conductive base and an air cell anode disposed on an outer surface of the electrically conductive base;
at least one third electrode unit disposed between the first electrode unit and the second electrode unit, having an airflow space therein and comprising a box metal electrically conductive base with an airflow plane, an air cell cathode disposed on an outer surface of the airflow plane and an air cell anode disposed on an outer surface of a plane opposite the airflow plane, wherein the box metal electrically conductive base comprises a metal non-gas-permeable plate, a metal gas permeable plate, and metal ribs joining the metal non-gas-permeable plate with the metal gas permeable plate; and
a first insulating frame, the number of which is larger than the number of the third electrode unit by one,
wherein the first, second and third electrode units are adjacent to each other, and
the first insulating frame spaces and joins adjacent electrode units to each other such that an air cell cathode and an air cell anode of the adjacent electrode units are opposed to each other, and the first insulating frame together with the adjacent electrode units forms an electrolytic solution container.

8. The air cell stack according to claim 7, wherein the air cell stack is of a liquid activated type in which the air cell stack starts to generate electric power when an electrolytic solution is injected in the electrolytic solution container.

* * * * *